United States Patent
Papasakellariou

(10) Patent No.: US 12,028,173 B2
(45) Date of Patent: Jul. 2, 2024

(54) ACKNOWLEDGMENT INFORMATION WITH REDUCED REDUNDANCIES

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 323 days.

(21) Appl. No.: 17/448,332

(22) Filed: Sep. 21, 2021

(65) Prior Publication Data
US 2022/0116157 A1     Apr. 14, 2022

Related U.S. Application Data

(60) Provisional application No. 63/089,117, filed on Oct. 8, 2020, provisional application No. 63/134,393, filed on
(Continued)

(51) Int. Cl.
*H04L 1/18* (2023.01)
*H04L 1/1812* (2023.01)
*H04L 1/1867* (2023.01)

(52) U.S. Cl.
CPC .......... *H04L 1/1887* (2013.01); *H04L 1/1812* (2013.01)

(58) Field of Classification Search
CPC ... H04W 28/04; H04W 72/04; H04W 72/042; H04W 88/08; H04L 5/0007; H04L 1/1887; H04L 1/1812
(Continued)

(56) References Cited

U.S. PATENT DOCUMENTS

| | | |
|---|---|---|
| 2018/0084457 A1 | 3/2018 | Lin |
| 2020/0021399 A1* | 1/2020 | Baldemair ............ H04L 1/1858 |

(Continued)

FOREIGN PATENT DOCUMENTS

| | | | |
|---|---|---|---|
| SE | WO 2019/073358 A1 * | 4/2019 | .............. H04L 1/18 |
| WO | 2019073358 A1 | 4/2019 | |
| WO | 2020146247 A2 | 7/2020 | |

OTHER PUBLICATIONS

3GPP TSG RAN WG1 #100bis, e-Meeting, Apr. 20-30, 2020, R1-2001654, Source: vivo, Title: Remaining issues on HARQ operation for NR-U, Agenda item: 7.2.2.2.3. (Year: 2020).*
(Continued)

*Primary Examiner* — Peter G Solinsky
*Assistant Examiner* — Sanjay K Dewan

(57) ABSTRACT

Methods and apparatuses for acknowledgement information with reduced redundancies. A method for a user equipment (UE) to provide a number of first hybrid automatic repeat request acknowledgement (HARQ-ACK) information bits includes determining a number of second HARQ-ACK information bits based on a HARQ-ACK codebook. The number of second HARQ-ACK information bits is larger than a first predetermined number and smaller than a second predetermined number. The first and second predetermined numbers are consecutive in a set of predetermined numbers. The method further includes determining the number of first HARQ-ACK information bits by appending a number of bits to the number of second HARQ-ACK information bits. The number of bits is equal to a difference between the second predetermined number and the number of second HARQ-ACK information bits. The method further includes transmitting an uplink channel with the number of first HARQ-ACK information bits.

20 Claims, 18 Drawing Sheets

Related U.S. Application Data on Jan. 6, 2021, provisional application No. 63/183,270, filed on May 3, 2021.

(58) Field of Classification Search
USPC .......................................................... 370/329
See application file for complete search history.

(56) References Cited

U.S. PATENT DOCUMENTS

| | | | |
|---|---|---|---|
| 2020/0304243 A1 | 9/2020 | Lin | |
| 2022/0140954 A1* | 5/2022 | Kim | H04L 1/1854 370/329 |
| 2023/0084972 A1* | 3/2023 | Choi | H04L 5/0053 370/329 |
| 2023/0163900 A1* | 5/2023 | Kim | H04L 1/1893 370/329 |
| 2023/0217498 A1* | 7/2023 | Lee | H04W 74/00 370/329 |

OTHER PUBLICATIONS

3GPP TS 38.213 v16.1.0 (Mar. 2020), Technical Specification, 3rd Generation Partnership Project; Technical Specification Group Radio Access Network; NR; Physical layer procedures for control (Release 16), (Year: 2020).*

"5G; NR; Physical channels and modulation (3GPP TS 38.211 version 16.5.0, Release 16)", ETSI TS 138 211 V16.5.0, Apr. 2021, 138 pgs.

"5G; NR; Multiplexing and channel coding (3GPP TS 38.212 version 16.5.0 Release 16)", ETSI TS 138 212 V16.5.0, Apr. 2021, 155 pages.

"5G; NR; Physical layer procedures for control (3GPP TS 38.213 version 16.5.0 Release 16)", ETSI TS 138 213 V16.5.0, Apr. 2021, 188 pages.

"5G; NR; Physical layer procedures for data (3GPP TS 38.214 version 16.5.0 Release 16)", ETSI TS 138 214 V16.5.0, Apr. 2021, 173 pages.

"5G; NR; Medium Access Control (MAC) protocol specification (3GPP TS 38.321 version 16.4.0 Release 16)", ETSI TS 138 321 V16.4.0, Apr. 2021, 159 pages.

"5G; NR; Radio Resource Control (RRC); Protocol specification (3GPP TS 38.331 version 16.4.1 Release 16)", ETSI TS 138 331 V16.4.1, Apr. 2021, 932 pages.

International Search Report and Written Opinion dated Feb. 4, 2022 regarding International Application No. PCT/KR2021/013897, 8 pages.

VIVO, "Remaining issues on HARQ operation for NR-U", 3GPP TSG RAN WG1#100bis, R1-2001654, Apr. 2020, 15 pages.

"3rd Generation Partnership Project; Technical Specification Group Radio Access Network; NR; Physical layer procedures for control (Release 16)", 3GPP TS 38.213 V16.1.0, Mar. 2020, 156 pages.

Partial European Search Report issued Feb. 2, 2024 regarding Application No. 21878057.5, 15 pages.

OPPO, "Discussion on HARQ-ACK transmission", 3GPP TSG RAN WG1 Meeting #91, R1-1719993, Nov. 2017, 6 pages.

Extended European Search Report issued May 14, 2024 regarding Application No. 21878057.5, 14 pages.

* cited by examiner

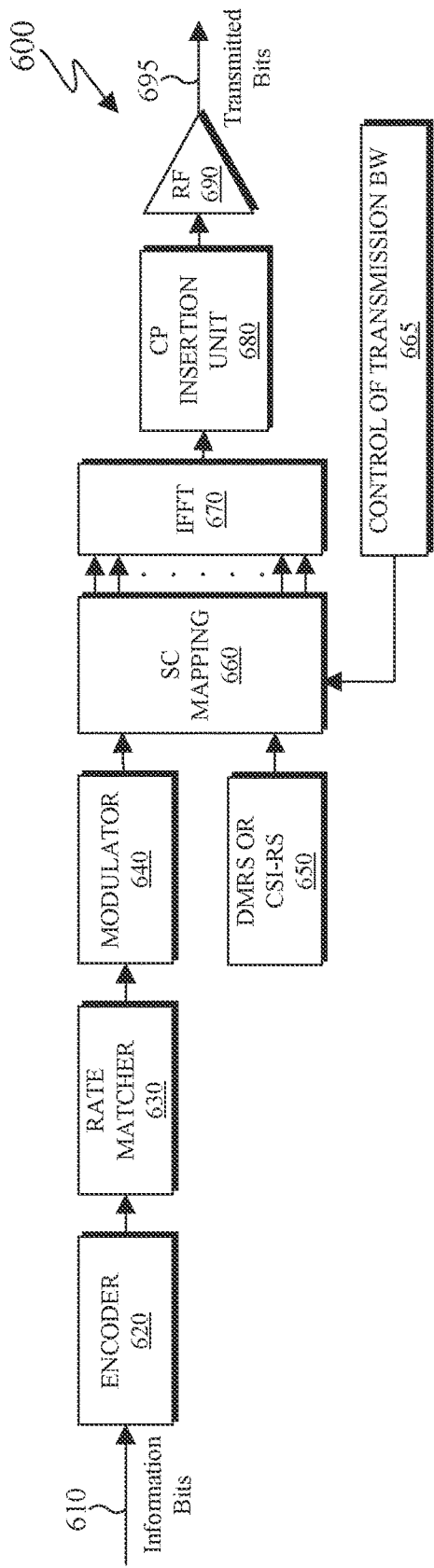
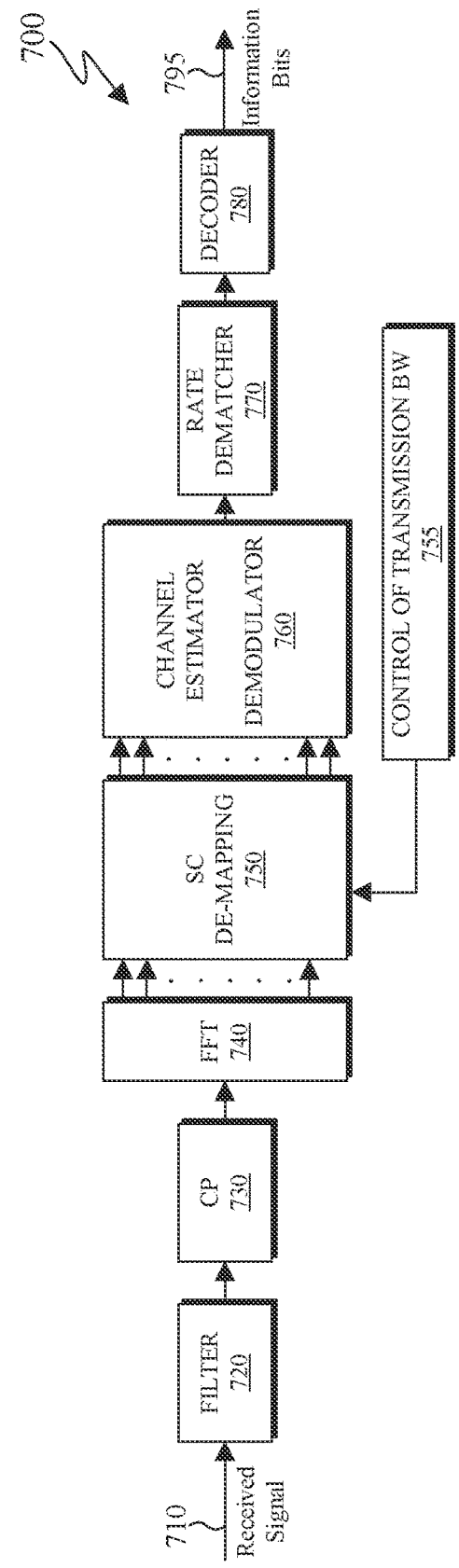
FIG. 6
FIG. 7

ACKNOWLEDGMENT INFORMATION WITH REDUCED REDUNDANCIES

CROSS-REFERENCE TO RELATED APPLICATION AND CLAIM OF PRIORITY

This application claims priority under 35 U.S.C. § 119(e) to (i) U.S. Provisional Patent Application No. 63/089,117 filed on Oct. 8, 2020, (ii) U.S. Provisional Patent Application No. 63/134,393 filed on Jan. 6, 2021, and (iii) U.S. Provisional Patent Application No. 63/183,270 filed on May 3, 2021. The above-identified provisional patent applications are hereby incorporated by reference in their entirety.

TECHNICAL FIELD

The present disclosure relates generally to wireless communication systems and, more specifically, the present disclosure relates to acknowledgement information with reduced redundancies.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to acknowledgement information with reduced redundancies.

In one embodiment, a method for a user equipment (UE) to provide a number of first hybrid automatic repeat request acknowledgement (HARQ-ACK) information bits is provided. The method includes determining a number of second HARQ-ACK information bits based on a HARQ-ACK codebook. The number of second HARQ-ACK information bits is larger than a first predetermined number and smaller than a second predetermined number. The first and second predetermined numbers are consecutive in a set of predetermined numbers. The method further includes determining the number of first HARQ-ACK information bits by appending a number of bits to the number of second HARQ-ACK information bits. The number of bits is equal to a difference between the second predetermined number and the number of second HARQ-ACK information bits. The method further includes transmitting a first physical uplink control channel (PUCCH), or a first physical uplink shared channel (PUSCH), with the number of first HARQ-ACK information bits.

In another embodiment, a UE is provided. The UE includes a processor configured to determine a number of second HARQ-ACK information bits based on a HARQ-ACK codebook. The number of second HARQ-ACK information bits is larger than a first predetermined number and smaller than a second predetermined number. The first and second predetermined numbers are consecutive in a set of predetermined numbers. The processor is further configured to determine a number of first HARQ-ACK information bits by appending a number of bits to the number of second HARQ-ACK information bits. The number of bits is equal to a difference between the second predetermined number and the number of second HARQ-ACK information bits. The UE further includes a transceiver operably coupled to the processor. The transceiver configured to transmit a first PUCCH, or a first PUSCH, with the number of first HARQ-ACK information bits.

In yet another embodiment, a base station is provided. The base station includes a transceiver configured to receive a first PUCCH, or a first PUSCH, with a number of first hybrid HARQ-ACK information bits. The base station further includes a processor operably coupled to the transceiver. The processor is configured to determine a number of second hybrid HARQ-ACK information bits based on a HARQ-ACK codebook. The number of second HARQ-ACK information bits is larger than a first predetermined number and smaller than a second predetermined number. The first and second predetermined numbers are consecutive in a set of predetermined numbers. The processor is further configured to determine the number of second HARQ-ACK information bits by removing a number of last bits from the number of first HARQ-ACK information bits, wherein the number of last bits is equal to a difference between the second predetermined number and the number of second HARQ-ACK information bits.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates a block diagram of an example transmitter structure using orthogonal frequency division multiplexing (OFDM) according to embodiments of the present disclosure;

FIG. 7 illustrates a block diagram of an example receiver structure using OFDM according to embodiments of the present disclosure;

DETAILED DESCRIPTION

Figure 1:
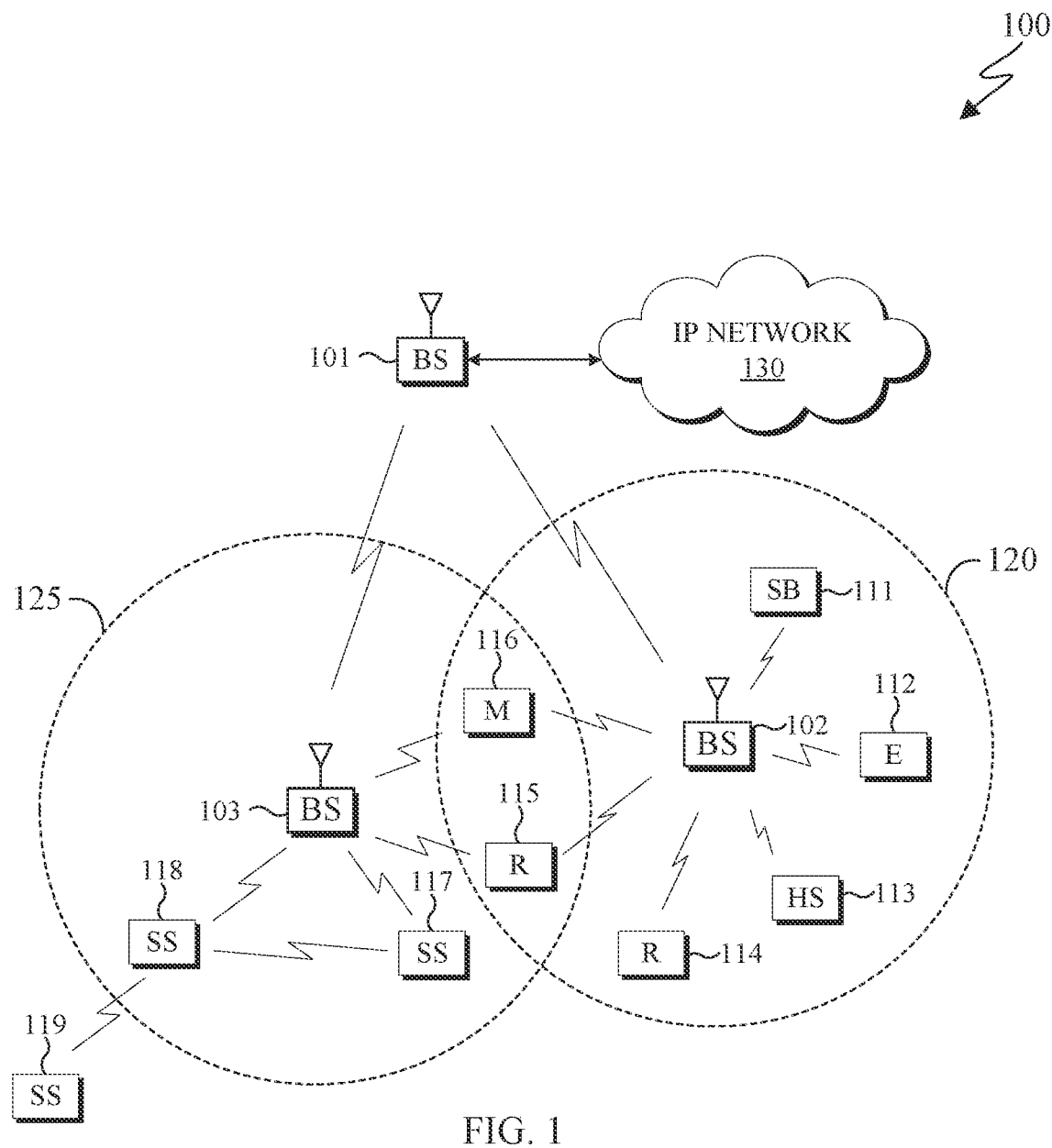
FIG. 1 illustrates an example wireless network according to embodiments of the present disclosure.

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: (i) 3GPP TS 38.211 v16.5.0, "NR; Physical channels and modulation," (ii) 3GPP TS 38.212 v16.5.0, "NR; Multiplexing and Channel coding," (iii) 3GPP TS 38.213 v16.5.0, "NR; Physical Layer Procedures for Control," (iv) 3GPP TS 38.214 v16.5.0, "NR; Physical Layer Procedures for Data," (v) 3GPP TS 38.321 v16.4.0, "NR; Medium Access Control (MAC) protocol specification," and (vi) 3GPP TS 38.331 v16.4.1, "NR; Radio Resource Control (RRC) Protocol Specification."

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, a drone, an appliance, and the like.

Figure 2:
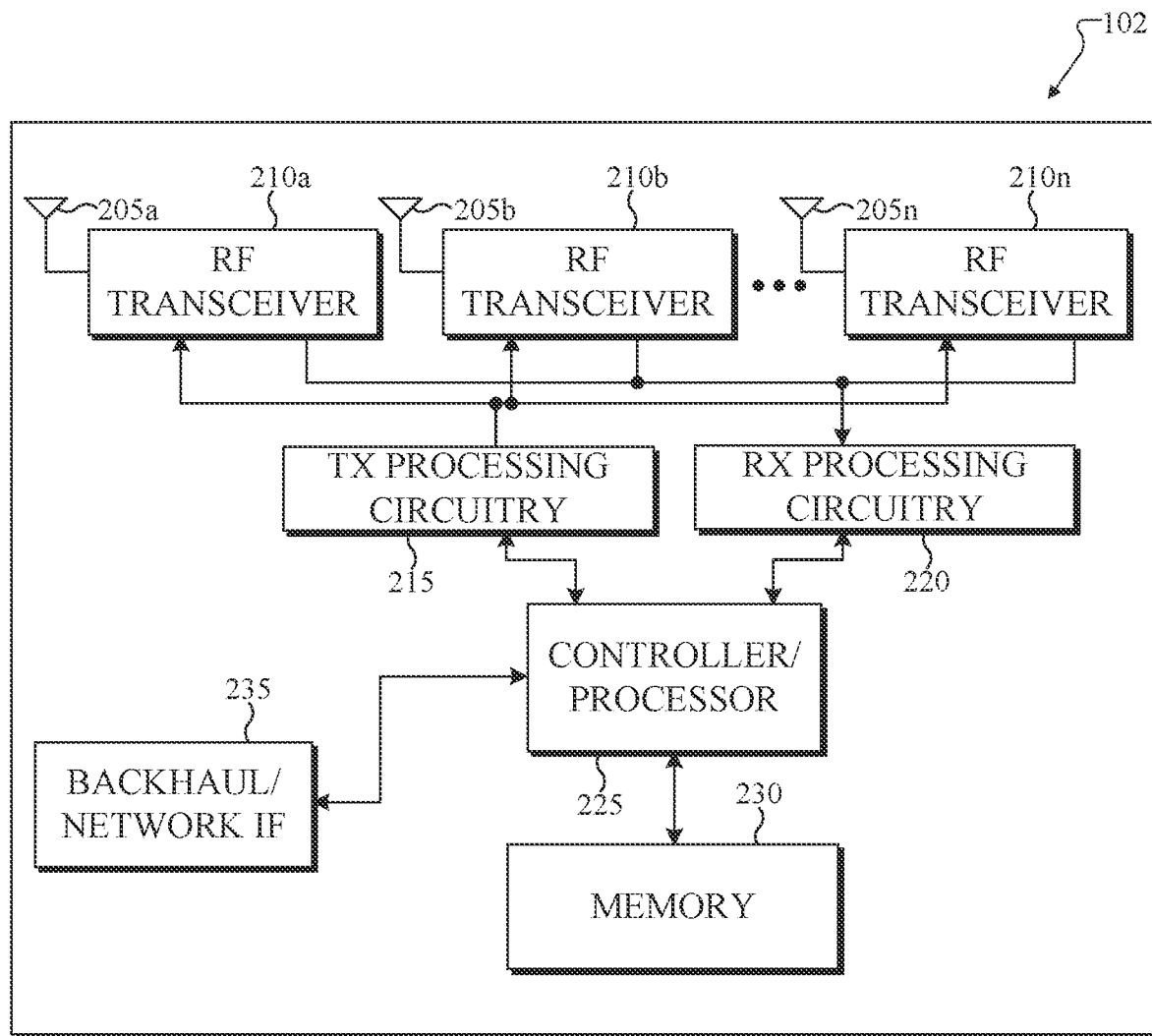
FIG. 2 illustrates an example base station (BS) according to embodiments of the present disclosure.
Figure 3:
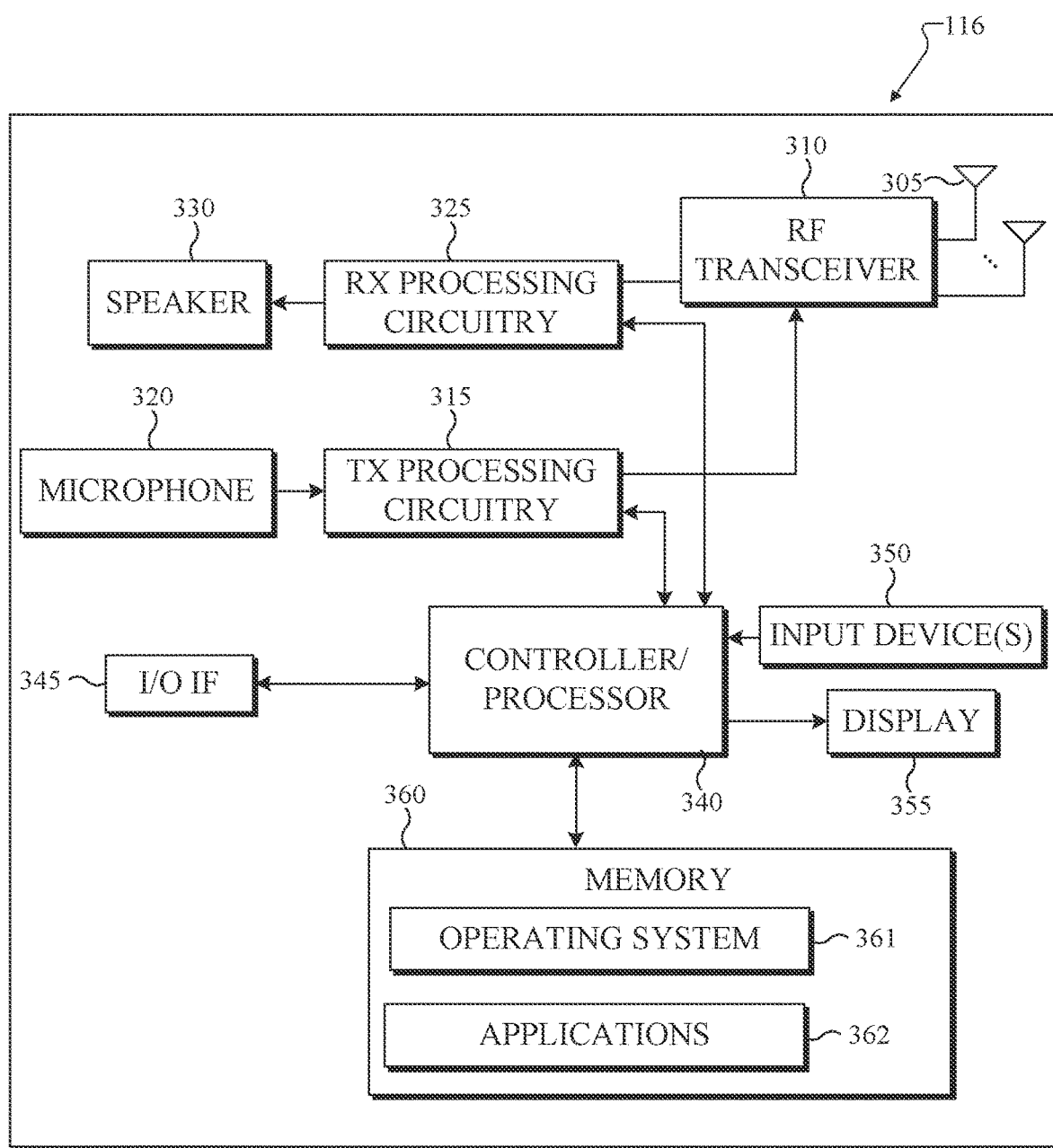
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-118 using 5G/NR, long term evolution (LTE), long term evolution-advanced (LTE-A), WiMAX, WiFi, or other wireless communication techniques.

In certain embodiments, multiple UEs (such as the UE 117, the UE 118, and the UE 119) may communicate directly with each other through device-2-device communication. In some embodiments, a UE, such as UE 119, is outside the coverage area of the network, but can communicate with other UEs inside the coverage area of the network, such as UE 118, or outside the coverage area of the network.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-119 include circuitry, programing, or a combination thereof for acknowledgement information with reduced redundancies. In certain embodiments, and one or more of the BSs 101-103 includes circuitry, programing, or a combination thereof for acknowledgement information with reduced redundancies.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support acknowledgement information with reduced redundancies and link adaptation using soft acknowledgement information. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. In certain embodiments, the controller/processor 225 supports acknowledgement information with reduced redundancies and link adaptation using soft acknowledgement information. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 and 117-119 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of downlink channel signals and the transmission of uplink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
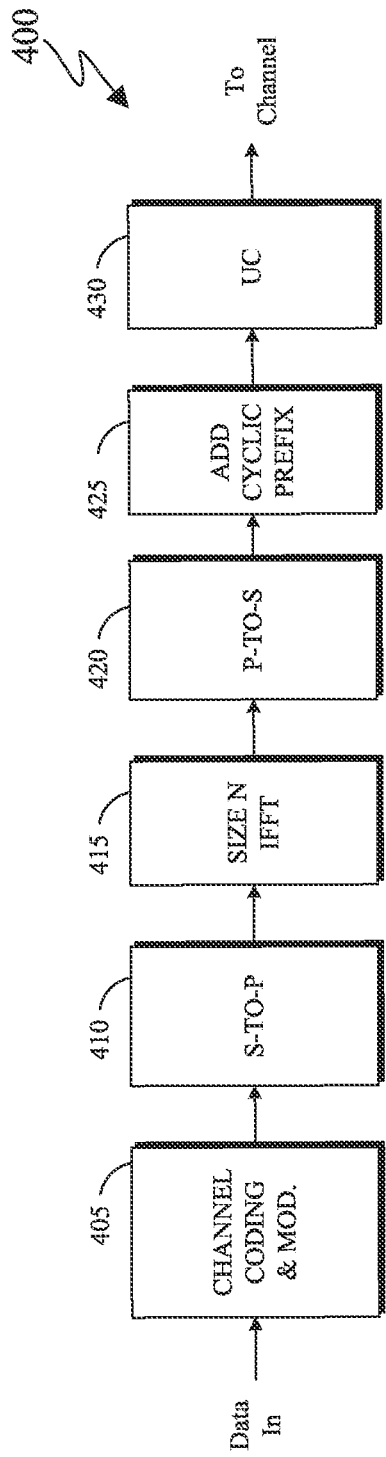
FIGS. 4 and 5 illustrate example wireless transmit and receive paths according to embodiments of present disclosure.
Figure 5:
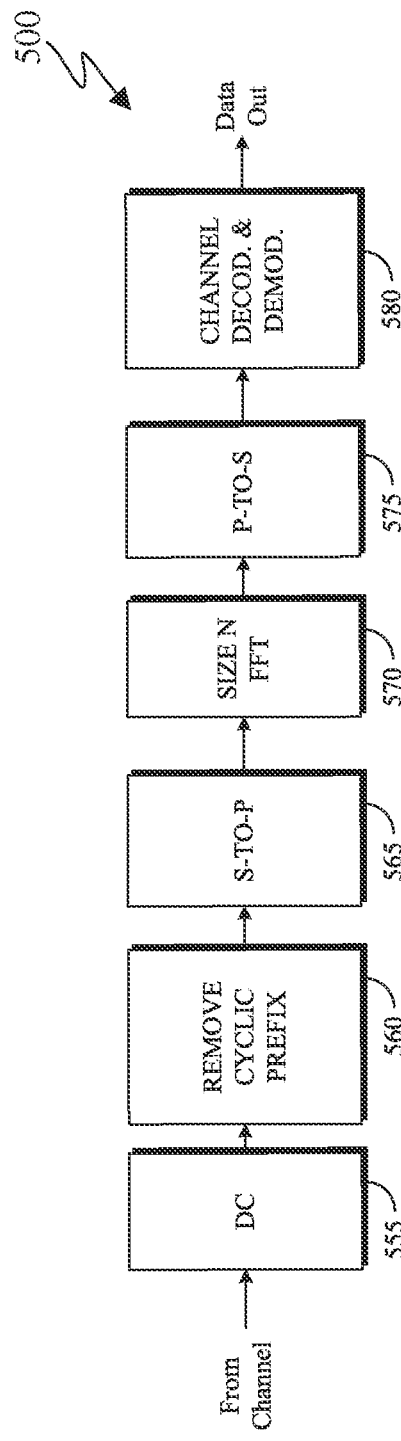

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support acknowledgement information with reduced redundancies and link adaptation using soft acknowledgement information as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 illustrated in FIG. 4 that is analogous to transmitting in the downlink to UEs 111-118 and may implement a receive path 500 as illustrated in FIGURE that is analogous to receiving in the uplink from UEs 111-118. Similarly, each of UEs 111-118 may implement a transmit path 400 for transmitting in the uplink to BSs 101-103 and may implement a receive path 500 for receiving in the downlink from BSs 101-103.

Furthermore, each of UEs 111-119 may implement a transmit path 400 for transmitting in the sidelink to another one of UEs 111-119 and may implement a receive path 500 for receiving in the sidelink from another one of UEs 111-119.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for downlink (DL) signaling or for uplink (UL) signaling on a cell is referred to as a slot and can include one or more symbols. A bandwidth (BW) unit is referred to as a resource block (RB). One RB includes a number of subcarriers (SCs). For example, a slot can have duration of one millisecond and an RB can have a bandwidth of 180 kHz and include 12 SCs with inter-SC spacing of 15 kHz. A subcarrier spacing (SCS) can be determined by a SCS configuration y as 2-15 kHz. A unit of one sub-carrier over one symbol is referred to as a resource element (RE). A unit of one RB over one symbol is referred to as a physical RB (PRB).

DL signals include data signals conveying information content, control signals conveying DL control information (DCI), reference signals (RS), and the like that are also known as pilot signals. A BS (such as the BS 102) transmits data information or DCI through respective physical DL shared channels (PDSCHs) or physical DL control channels (PDCCHs). A PDSCH or a PDCCH can be transmitted over a variable number of slot symbols including one slot symbol. A BS transmits one or more of multiple types of RS including channel state information RS (CSI-RS) and demodulation RS (DM-RS). A CSI-RS is intended for UEs (such as the UE 116) to perform measurements and provide channel state information (CSI) to a BS. For channel measurement or for time tracking, non-zero power CSI-RS (NZP CSI-RS) resources can be used. For interference measurement reports (IMRs), CSI interference measurement (CSI-IM) resources can be used. The CSI-IM resources can also be associated with a zero power CSI-RS (ZP CSI-RS) configuration. A UE can determine CSI-RS reception parameters through DL control signaling or higher layer signaling, such as radio resource control (RRC) signaling from a gNB. A DM-RS is typically transmitted within a BW of a respective PDCCH or PDSCH and a UE can use the DM-RS to demodulate data or control information.

UL signals also include data signals conveying information content, control signals conveying UL control information (UCI), DM-RS associated with data or UCI demodulation, sounding RS (SRS) enabling a gNB to perform UL channel measurement, and a random access (RA) preamble enabling a UE (such as the UE 116) to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol. When a UE simultaneously transmits data information and UCI, the UE can multiplex both in a PUSCH or, depending on a UE capability, transmit both a PUSCH with data information and a PUCCH with UCI at least when the transmissions are on different cells.

UCI includes hybrid automatic repeat request (HARQ) acknowledgement (ACK) information, indicating correct or incorrect detection of data transport blocks (TBs) or of code block groups (CBGs) in a PDSCH, scheduling request (SR) indicating whether a UE has data in its buffer to transmit, and CSI reports enabling a gNB to select appropriate parameters for PDSCH or PDCCH transmissions to a UE. A CSI report can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, of a CSI-RS resource indicator (CRI) used to obtain the CSI report, and of a rank indicator (RI) indicating a transmission rank for a PDSCH.

In certain embodiments, UL RS includes DM-RS and phase tracking RS (PT-RS). DM-RS is typically transmitted within a BW of a respective PUSCH or PUCCH. A gNB can use a DM-RS to demodulate information in a respective PUSCH or PUCCH. A UE can use a PT-RS to track a phase of a received signal, particularly for operation in a frequency range above 6 GHz. SRS is transmitted by a UE to provide a gNB with an UL CSI and, for a time division duplexing (TDD) system, to also provide a PMI for DL transmission. Further, as part of a random access procedure or for other purposes, a UE can transmit a physical random access channel (PRACH).

A UE can generate hybrid automatic repeat request acknowledgement (HARQ-ACK) information in response to (i) reception of TBs/CBGs in a PDSCH, (ii) a detection of a DCI format indicate release of a semi-persistently scheduled PDSCH, (iii) a detection of a DCI format indicating a change of an active bandwidth part (BWP) to a dormant BWP or to a non-dormant BWP for secondary cells, and (iv) the like. For brevity, the reasons for a UE to generate HARQ-ACK information will generally not be mentioned in the following and, when needed, only PDSCH receptions will be referred to.

DL transmissions and UL transmissions can be based on an orthogonal frequency division multiplexing (OFDM) waveform including a variant using DFT precoding that is known as DFT-spread-OFDM.

FIG. 6 illustrates a block diagram 600 of an example transmitter structure using orthogonal frequency division multiplexing (OFDM) according to embodiments of the present disclosure. FIG. 7 illustrates a block diagram 700 of an example receiver structure using OFDM according to embodiments of the present disclosure.

The transmitter structure as shown in the block diagram 600 and the receiver structure as shown in the block diagram 600 can be similar to the RF transceivers 210a-210n of FIG. 2 and the RF transceiver 310 of FIG. 3. The example block diagram 600 of FIG. 6 and the block diagram 700 of FIG. 7 are for illustration only and other embodiments can be used without departing from the scope of the present disclosure.

As illustrated in the block diagram 600, information bits 610, such as DCI bits or data bits, are encoded by encoder 620, rate matched to assigned time/frequency resources by rate matcher 630, and modulated by modulator 640. Subsequently, modulated encoded symbols and demodulation reference signal (DMRS) or CSI-RS 650 are mapped to SCs by SC mapping unit 660 with input from BW selector unit 665, an inverse fast Fourier transform (IFFT) is performed by filter 670, a cyclic prefix (CP) is added by CP insertion unit 680, and a resulting signal is filtered by filter 690 and transmitted by a radio frequency (RF) unit as transmitted bits 695.

As illustrated in the block diagram 700, a received signal 710 is filtered by filter 720, a CP removal unit 730 removes a CP, a filter 740 applies a fast Fourier transform (FFT), SCs de-mapping unit 750 de-maps SCs selected by BW selector unit 755, received symbols are demodulated by a channel estimator and a demodulator unit 760, a rate de-matcher 770 restores a rate matching, and a decoder 780 decodes the resulting bits to provide information bits 790.

For HARQ-ACK transmission on PUSCH that includes a transport block, a number of coded modulation symbols per layer for HARQ-ACK transmission, denoted as $Q'_{ACK}$, is described as in Equation (1), below.

$$Q'_{ACK} = \min\left\{\left\lceil \frac{(O_{ACK} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right. \quad (1)$$

$$\left. \left\lceil \alpha \cdot \sum_{l=0}^{N_{symb,all}^{PUSCH}-1} M_{SC}^{UCI}(l) \right\rceil \right\}$$

Here, the parameter, $O_{ACK}$, is the number of HARQ-ACK bits. It is noted that if $O_{ACK} \geq 360$, then $L_{ACK} = 11$. Otherwise $L_{ACK}$ is the number of CRC bits for HARQ-ACK information bits. The parameter $\beta_{offset}^{PUSCH} = \beta_{offset}^{HARQ-ACK}$ and is provided by higher layers or indicated by a DCI format scheduling the PUSCH transmission from a set of values provided by higher layers. The parameter, $C_{UL-SCH}$, is the number of code blocks for the transport block of the PUSCH transmission. The parameter, $K_r$, is the r-th code block size for transport of the PUSCH transmission. The parameter, $M_{sc}^{PUSCH}$, is the scheduled bandwidth of the PUSCH transmission, expressed as a number of subcarriers. The parameter, $M_{sc}^{PT-RS}(l)$, is the number of subcarriers in OFDM symbol l that carries PT-RS in the PUSCH transmission. The parameter, a, is configured by higher layers. The parameter, $l_0$, is the symbol index of the first OFDM symbol that does not carry DM-RS of the PUSCH, after the first DM-RS symbol(s), in the PUSCH transmission. Additionally, the parameter, $M_{sc}^{UCI}(l)$ is the number of resource elements that can be used for transmission of UCI in OFDM symbol l. For $l=0, 1, 2, \ldots, N_{symb,all}^{PUSCH}-1$, in the PUSCH transmission and $N_{symb,all}^{PUSCH}$ is the total number of OFDM symbols of the PUSCH, including all OFDM symbols used for DM-RS. It is noted that for any OFDM symbol that carries DM-RS of the PUSCH, $M_{sc}^{UCI}(l)=0$. Similarly, for any OFDM symbol that does not carry DM-RS of the PUSCH, $M_{sc}^{UCI}(l)=MS_{sc}^{PUSCH}-M_{sc}^{PT-RS}(l)$.

If a number of HARQ-ACK information bits to be multiplexed in a PUSCH is 0 bits, 1 bits, or 2 bits, there is a number of reserved REs for potential multiplexing of HARQ-ACK information that is calculated by setting $O_{ACK}=2$. Additional aspects for a determination of coded modulation symbols for HARQ-ACK information in a PUSCH, including when the PUSCH does not include any transport blocks.

Embodiments of the present disclosure take into consideration that 5G can support multiple service types, for a same UE or for different UEs, that require BLER targets for TBs or UCI types or require scheduling latencies that can be different by several orders of magnitude. Such service types are associated with different priority values. A UE, such as the UE 116, can identify a priority value for a PDSCH reception or PUSCH/PUCCH transmission. When a PDSCH reception by or PUSCH/PUCCH transmission from a UE is scheduled by a DCI format, different DCI formats (with different sizes) or a priority indicator field in a DCI format can be used to indicate a corresponding priority value. When a PDSCH reception by, or a PUSCH/PUCCH transmission from, a UE is configured by higher layers, the configuration can include a corresponding priority value.

For some service types, such as for example for ultra-reliable low latency communication (URLLC) services, a target BLER for a TB provided in a PDSCH reception can be very small, such as $10^{-6}$ or $10^{-6}$, and therefore a probability that a UE provides HARQ-ACK with a NACK value for a TB is also very small. Open loop link adaptation (OLLA) at a serving gNB for PDSCH transmissions that relies on a ratio of NACK values to ACK values for HARQ-ACK information is then practically infeasible to apply due to the scarcity of NACK values. To address that problem, soft ACK values have been considered where instead of a binary outcome for a TB detection, such as ACK or NACK, a UE can report soft values for the ACK. The UE can determine a soft ACK value based on one or more metrics such as a number of iterations for a LDPC decoder, or soft log-likelihood metric values prior to decoding, and so on. A gNB can then use the soft ACK values to perform OLLA for PDSCH transmissions to the UE, for example by computing a ratio of a sum for a number of NACK, small soft ACK, and possibly medium soft ACK values to a number of large soft ACK values. Although reporting soft ACK values from a UE can improve OLLA for the UE at a serving gNB, a corresponding HARQ-ACK information payload is increased, such as doubled, as the UE needs to report two or three soft ACK values and a NACK value, using two HARQ-ACK information bits per TB instead of one (when only ACK or NACK is reported). Accordingly, embodiments of the present disclosure take into consideration that there is a need to define mechanisms for a UE to determine soft ACK values, such as whether an ACK value is small or large. Embodiments of the present disclosure also take into consideration that there is also another need to reduce an HARQ-ACK information payload associated with reporting soft ACK values.

When a UE supports transmissions/receptions with different priorities, the UE may have to simultaneously transmit a first PUSCH or a first PUCCH associated having a first priority type and a second PUSCH or a second PUCCH having a second priority type. A priority type of a PUCCH or PUSCH transmission is equivalent with a priority value for TBs or UCI types that are multiplexed in the PUCCH or PUSCH transmission. In such case, the UE can transmit the PUCCH or PUSCH having the larger priority value and drop transmission of the PUCCH or PUSCH having the smaller priority value.

A number of CRC bits used to identify an incorrect decoding of a HARQ-ACK codebook, or in general of a UCI codeword, should reflect a target HARQ-ACK codebook reception reliability. For example, although 6 CRC bits or 11 CRC bits can be adequate for a target BLER of $10^{-2}$, as a probability of an incorrect CRC checksum is about $1.5 \times 10^{-2}$ or $5 \times 10^{-4}$ respectively, they are not adequate for a target BLER of $10^{-5}$. Therefore, embodiments of the present disclosure take into consideration that there is a need to adjust a number of CRC bits for encoding of a HARQ-ACK codebook according to a target reception reliability of the HARQ-ACK codebook.

For industrial internet of things (IoT) applications, traffic signal control (TSC) is an effective mechanism to address traffic congestion and offer improved traffic management. TSC traffic can be supported by semi-persistently scheduled (SPS) PDSCH transmissions but TSC traffic can be dynamic and a single SPS configuration does not suffice. Similar conditions apply for time sensitive networking (TSN) traffic. For that reason, a UE can be provided multiple SPS PDSCH configurations with different periodicity, such as up to 8 SPS PDSCH configurations, per TSC traffic. A consequence is that for most of the SPS PDSCH configurations, a UE would not receive a corresponding SPS PDSCH. However, multiple such SPS PDSCH configurations can have a corresponding HARQ-ACK information report in a same PUCCH transmission occasion. Therefore, a corresponding HARQ-ACK codebook payload increases while most of the HARQ-ACK information has a NACK value that is known to the gNB because the gNB did not transmit a corresponding SPS PDSCH. A size of a PUCCH resource, such as a number of RBs, a PUCCH transmission power, or a number of REs in a PUSCH when the UE multiplexes HARQ-ACK information in a PUSCH, increase as a HARQ-ACK information payload increases. Therefore, if the UE would report NACK values due to an absence of SPS PDSCH receptions, a corresponding PUCCH or PUSCH transmission would result to unnecessary resource overhead, UE power consumption, and interference to neighboring cells.

A UE could measure a received power of a DM-RS associated with a hypothetical SPS PDSCH reception. Based on whether or not the measurement is larger than a threshold, the UE can determine presence or absence of the SPS PDSCH reception and generate HARQ-ACK information only when the UE determines presence of the SPS PDSCH reception. In practice, such a determination can be inaccurate not only because of interference or fading that the DM-RS can experience, but also because the gNB should not be prevented from utilizing SPS PDSCH resources for transmissions to other UEs when the gNB does not transmit corresponding SPS PDSCHs to the UE. An incorrect decision by the UE for a presence or absence of an SPS PDSCH reception can result to an unaligned understanding between the gNB and the UE of a HARQ-ACK codebook size, a PUCCH resource used for a PUCCH transmission, or of a number of REs for HARQ-ACK multiplexing in a PUSCH, thereby resulting to general reception errors at the gNB. Therefore, embodiments of the present disclosure take into consideration that there is a need to reduce a payload of HARQ-ACK information corresponding to possible PDSCH receptions according to multiple SPS PDSCH configurations.

Embodiments of the present disclosure take into consideration that there is a need to define mechanisms for a UE to determine and report soft ACK values. Embodiments of the present disclosure also take into consideration that there is need to reduce an HARQ-ACK information payload associated with reporting soft ACK values. Embodiments of the present disclosure further take into consideration that there is need to reduce a payload of HARQ-ACK information corresponding to configured SPS PDSCH receptions according to multiple SPS PDSCH configurations. Additionally, embodiments of the present disclosure take into consideration that there is need to adjust a number of CRC bits for encoding of a HARQ-ACK codebook according to a configuration and a priority of the HARQ-ACK codebook.

Accordingly, embodiments of the present disclosure (such as those described in FIGS. 12-15) relate to defining mechanisms for a UE (such as the UE 116) to determine and report soft ACK values. Embodiments of the present disclosure also relate to reducing an HARQ-ACK information payload associated with reporting soft ACK values. Embodiments of the present disclosure (such as those described in FIG. 11) further relate to adjusting a number of CRC bits for encoding of a HARQ-ACK codebook according to a configuration and a priority of the HARQ-ACK codebook. Additionally, embodiments of the present disclosure (such as those described in FIGS. 8-10) relate to reducing a payload of HARQ-ACK information corresponding to configured SPS PDSCH receptions according to multiple SPS PDSCH configurations.

In certain embodiments, a TB in a PDSCH reception of a PUSCH transmission is associated with a modulation and coding scheme (MCS) that is provided to the UE by an MCS index of an MCS table as described in Table 1, below. In particular, Table 1 is an MCS index table for PDSCH. The UE can be provided a value of the MCS index $I_{MCS}$ and, based on the $I_{MCS}$, the UE can determine a modulation order $Q_m$ (e.g. $Q_m=2$ for QPSK, $Q_m=4$ for 16QAM, and $Q_m=6$ for 16QAM) and a code rate for the TB reception. Then, based on resource allocation for the PDSCH reception or PUSCH transmission that provides the TB, the UE can determine a TB size (TBS).

TABLE 1

MCS index table for PDSCH

| MCS Index, $I_{MCS}$ | Modulation Order, $Q_m$ | Target code Rate R x [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

A UE can be configured a HARQ-ACK codebook type to provide HARQ-ACK information in response to decoding outcomes of DCI formats in PDCCH receptions or of TBs in PDSCH receptions. The HARQ-ACK codebook can be a Type-1 HARQ-ACK codebook, a Type-2 HARQ-ACK codebook including a possible grouping of two Type-2 HARQ-ACK codebook, or a Type-3 HARQ-ACK codebook.

As discussed above, for some service types, such as for example for URLLC services, a target BLER for a TB provided in a PDSCH reception can be very small, such as $10^{-5}$ or $10^{-6}$, and therefore a probability that a UE provides HARQ-ACK with a NACK value for a TB is also very small. OLLA at a serving gNB for PDSCH transmissions that relies on a ratio of NACK values to ACK values for HARQ-ACK information is then practically infeasible to apply due to the scarcity of NACK values.

It is noted that the UE may also report a single HARQ-ACK information bit to represent both a NACK (incorrect TB decoding) and a DTX. Here, DTX refers to the case that the gNB transmitted a PDCCH with a DCI format associated with generation of HARQ-ACK information by the UE, but the UE failed to detect the DCI format.

In certain embodiments, it is beneficial, for link adaptation of transmissions from a serving gNB to a UE, for the UE to inform the serving gNB of a MCS adjustment/offset that the UE uses to achieve a predetermined BLER for a TB that was transmitted to the UE with a first MCS. For example, the MCS offset can be positive when the UE correctly decodes the TB and negative when the UE incorrectly decodes the TB. In general, the MCS offset can be negative even when the UE correctly decodes the TB when the UE determines that a BLER for the TB decoding with the first MCS is larger than the target BLER. For example, the UE can determine an MCS offset based on one or more metrics such as a number of iterations for a LDPC decoder, or soft log-likelihood metric values prior to decoding, failed parity check bits, and so on. A gNB can then use the reported MCS offsets ACK to perform OLLA for PDSCH transmissions to the UE.

Embodiments of the present disclosure take into consideration that there is a need to define procedures for generating MCS offset values by a UE. Embodiments of the present disclosure take also into consideration that there is a need to determine procedures for multiplexing HARQ-ACK information with MCS offset values in a HARQ-ACK codebook. Embodiments of the present disclosure further take into consideration that there is a need to determine procedures for reporting MCS offset values by a UE.

Accordingly, embodiments of the present disclosure (such as those described in FIGS. 16-18) relate to defining procedures for generating MCS offset values by a UE. Embodiments of the present disclosure (such as those described in FIGS. 19 and 20) also relate to determining procedures for reporting MCS offset values by a UE.

In the following examples and embodiments, when referring to HARQ-ACK information associated with a DCI format, an assumption is that the HARQ-ACK information is in response to a TB decoding outcome in a PDSCH reception that is scheduled by the DCI format. However, relevant embodiments are applicable when the HARQ-ACK information is in response to an SPS PDSCH release on, in general, in response to any DCI format triggering a particular action that is associated with a HARQ-ACK information report. In the following, a parameter name in italics refers to a parameter provided by higher layers.

Embodiments of the present disclosure describe reducing HARQ-ACK information payload for multiple SPS PDSCH receptions. The following examples and embodiments, such as those of FIGS. 8, 9, and 10 describe reductions in HARQ-ACK information payload for multiple SPS PDSCH receptions. In these embodiments, this disclosure considers a reduction in HARQ-ACK information payload when a UE is configured to receive multiple SPS PDSCHs that the UE provides corresponding HARQ-ACK information in a same PUCCH.

Figure 8:
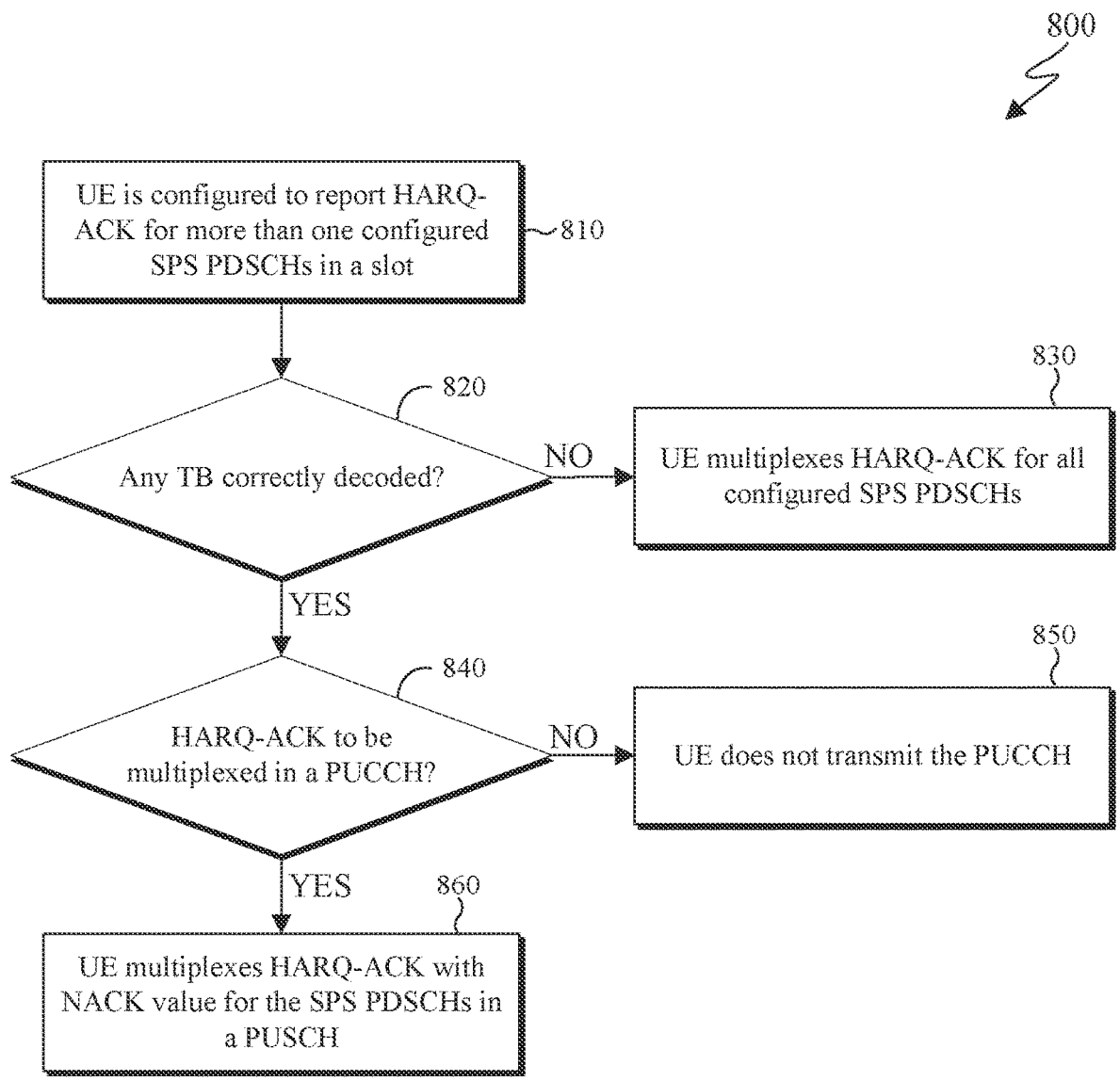
FIGS. 8 and 9 illustrates an example method of a UE reporting hybrid HARQ-ACK information for more than one configured semi-persistently scheduled (SPS) physical downlink shared channels (PDSCH) receptions in a PUCCH or in a PUSCH according to embodiments of the present disclosure.
Figure 9:
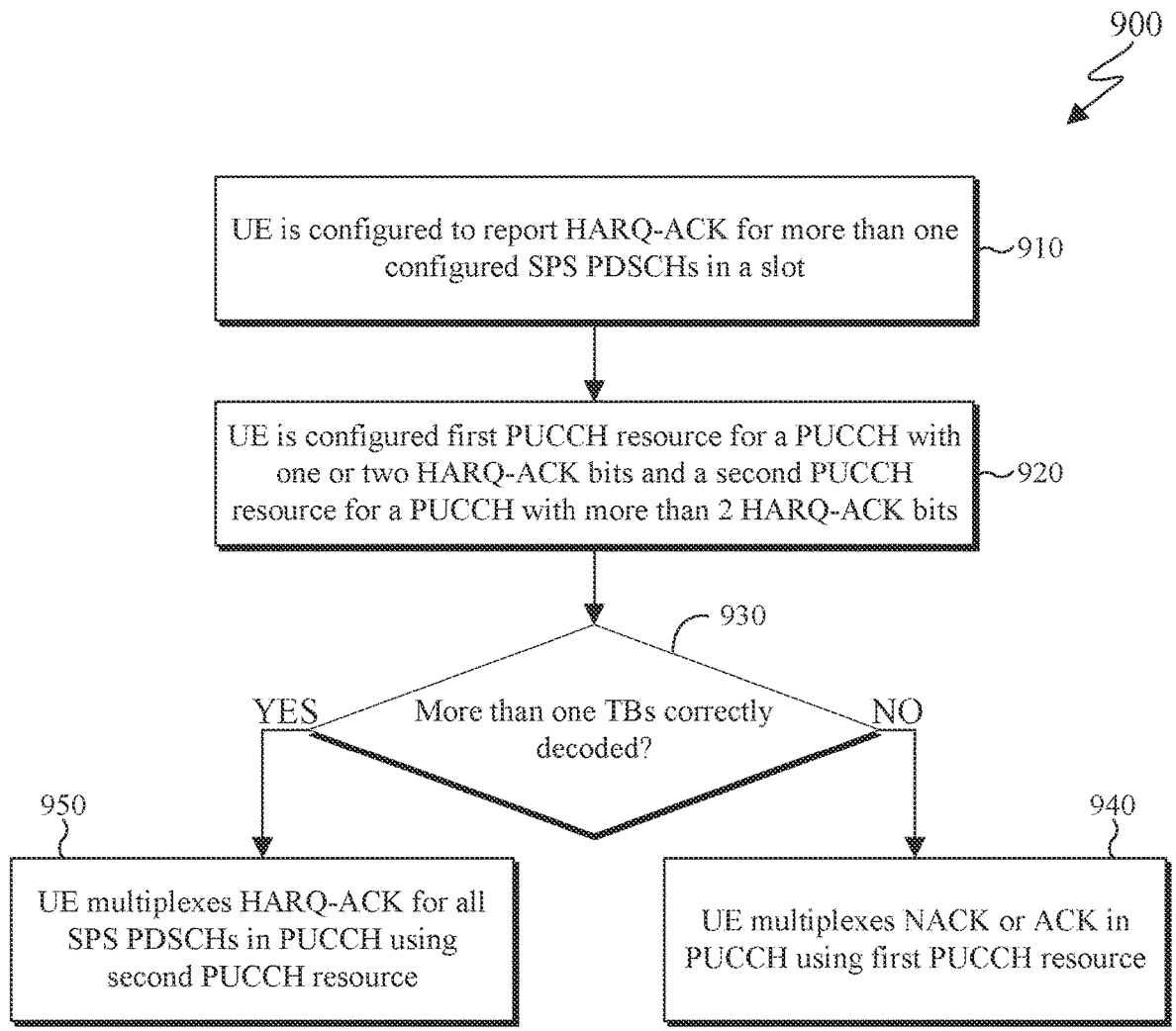
Figure 10:
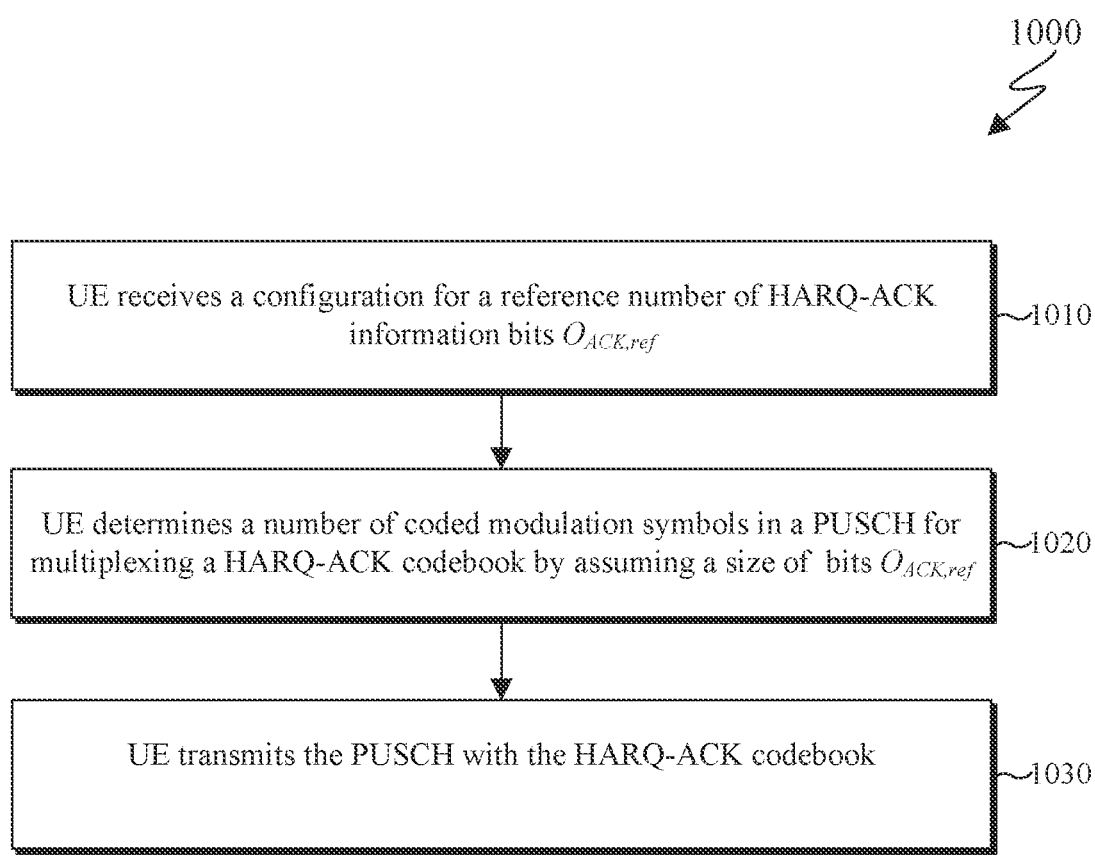
FIG. 10 illustrates an example method of a UE determining a number of coded modulation symbols for multiplexing HARQ-ACK codebook in a PUSCH transmissions according to embodiments of the present disclosure.

FIGS. 8 and 9 illustrates example methods 800 and 900, respectively, of a UE reporting HARQ-ACK information for more than one configured SPS PDSCH receptions in a PUCCH or in a PUSCH according to embodiments of the present disclosure. FIG. 10 illustrates an example method 1000 of a UE determining a number of coded modulation symbols for multiplexing HARQ-ACK codebook in a PUSCH transmissions according to embodiments of the present disclosure. The steps of the method 800, the method 900, and the method 1000 can be performed by any of the UEs 111-118 of FIG. 1, such as the UE 116 of FIG. 3. The method 800, the method 900, and the method 1000 are for illustration only and other embodiments can be used without departing from the scope of the present disclosure.

In certain embodiments, a reduction in a HARQ-ACK codebook size, when a UE (such as the UE 116) is configured for multiple SPS PDSCH receptions, is based on the UE determining incorrect decoding of TBs in SPS PDSCH receptions instead of on determining presence of absence of SPS PDSCH receptions.

In a first approach, for SPS PDSCH receptions with HARQ-ACK information that is configured to be multiplexed in a same PUCCH transmission in a slot, the UE transmits the PUCCH only when there is at least one HARQ-ACK information bit with ACK value; otherwise, the UE does not transmit the PUCCH. When the HARQ-ACK information is to be multiplexed in a PUSCH transmission, for example when the UE does not simultaneously transmit a PUCCH and a PUSCH, the UE multiplexes one HARQ-ACK information bit with NACK value over reserved REs in the PUSCH when there is no HARQ-ACK information bit with ACK value for the configured SPS PDSCH receptions. When there is at least one HARQ-ACK information bit with ACK value, the UE multiplexes HARQ-ACK information bits for all configured SPS PDSCH receptions. The first approach is described in FIG. 8.

As shown in FIG. 8, a UE (such as the UE 116) is configured to report HARQ-ACK information for more than one configured SPS PDSCH receptions in a slot (step 810). In step 820, the UE determines whether the UE correctly decodes a TB for any of the more than one configured SPS PDSCH receptions for generation of a corresponding HARQ-ACK information bit with ACK value. When the UE correctly decodes at least one TB, the UE, in step 830, multiplexes HARQ-ACK information for all configured SPS PDSCH receptions. Alternatively, when the UE does not correctly decode any TB, the UE, in step 840, determines whether the HARQ-ACK information for the configured SPS PDSCH receptions is to be multiplexed in a PUSCH or in a PUCCH transmission in the slot. In response to determining that the HARQ-ACK information is to be multiplexed in a PUCCH transmission in the slot, the UE, in step 850 does not transmit the PUCCH. Alternatively, in response to determining that HARQ-ACK information for the configured SPS PDSCH receptions is to be multiplexed in a PUSCH, the UE, in step 860, multiplexes one HARQ-ACK information bit with NACK value in the PUSCH.

As described above, the first approach offers operational simplicity but at the cost of degraded reception reliability due to the on-off-keying (OOK) transmission type since the UE transmits a PUCCH only when at least one of the HARQ-ACK information bits in the PUCCH has an ACK value. Compared to binary phase shift keying (BPSK), OOK has a 3 dB loss in detection reliability.

In a second approach, in order to avoid a degraded reception reliability of the first approach (as described above and in FIG. 8), a UE (such as the UE 116) is configured with a first PUCCH resource to transmit a PUCCH with a NACK value in a slot when the UE does not correctly decode any TB in SPS PDSCH receptions with respective HARQ-ACK information that the UE is configured to report in a PUCCH in the slot. Further, when the UE correctly decodes one TB from the SPS PDSCH receptions, the UE can use the first PUCCH resource to transmit a PUCCH with an ACK value. When the UE correctly decodes more than one TB from the SPS PDSCH receptions, the UE can use a second PUCCH resource that the UE is configured for a PUCCH transmission with HARQ-ACK information bits for all SPS PDSCH receptions with corresponding HARQ-ACK information in a PUCCH transmission in the slot. If the number of the SPS PDSCH receptions is two, the UE can use the first PUCCH resource to transmit corresponding HARQ-ACK information for both SPS PDSCH receptions using for example a PUCCH format 1. The UE transmits the PUCCH with HARQ-ACK information for all SPS PDSCH receptions regardless of a correct or incorrect decoding outcome for corresponding TBs when the HARQ-ACK information includes at least two ACK values. For multiplexing HARQ-ACK information in a PUSCH transmission, the procedure of the first approach remains applicable for the second approach. The second approach is described in FIG. 9.

As shown in FIG. 9, a UE is configured to report HARQ-ACK information for more than one configured SPS PDSCH receptions in a slot (step 910). In step 920, the UE is also configured with a first PUCCH resource for transmitting a PUCCH with one or two HARQ-ACK information bits and a second PUCCH resource for transmitting a PUCCH with more than two HARQ-ACK information bits. In step 930 the UE determines whether the UE correctly decodes more than one TB for the configured SPS PDSCH receptions. When the UE does not correctly decode more than one a TB, the UE, in step 940, multiplexes HARQ-ACK information with NACK value or with ACK value in a PUCCH transmission using the first PUCCH resource. It is noted that step 940 can also be performed when the UE does not correctly decode any TB or when the UE correctly decodes only one TB. When the UE correctly decodes more than two TBs, the UE, in step 950, UE multiplexes HARQ-ACK information for all configured SPS PDSCH receptions in a PUCCH transmission using the second PUCCH resource 950.

It is noted that if a number of configured SPS PDSCH receptions that the UE reports corresponding HARQ-ACK information in a slot is one or two, the UE multiplexes HARQ-ACK information in a PUCCH transmission using the first PUCCH resource regardless of decoding outcomes for TBs.

With the second approach (described above and in FIG. 9), an error can occur when the gNB transmits two or more SPS PDSCHs to the UE and the UE correctly decodes a TB for only one of the SPS PDSCH receptions. When there is a relatively larger probability, such as larger than $10^{-1}$, that a gNB would transmit multiple SPS PDSCHs to a UE and the UE would need to provide corresponding HARQ-ACK information in a same PUCCH, the gNB can configure the UE to operate with the first approach. Otherwise, a combined probability for the error event associated with the second approach is small as it is conditioned on the gNB transmitting multiple SPS PDSCHs to the UE, with corresponding HARQ-ACK information in a same PUCCH, and the UE correctly decoding a TB only for one of the multiple SPS PDSCHs. For a TB BLER of $10^{-4}$ and a probability of multiple SPS PDSCH receptions with HARQ-ACK information in a same PUCCH of less than $10^{-1}$, a combined probability is less than $2\times10^{-5}$ and it is typically smaller than a probability for incorrect decoding of HARQ-ACK information at the gNB. Further, the gNB can identify the error case based on the reception of a PUCCH in a resource corresponding to multiplexing one HARQ-ACK bit (with NACK or ACK value) instead of in a resource corresponding to multiplexing of more than one HARQ-ACK bits, and can schedule retransmissions of the corresponding SPS PDSCHs.

In certain embodiments, when a UE multiplexes (in a PUCCH transmission or in a PUSCH transmission in a slot) HARQ-ACK information bits for PDSCH receptions scheduled by DCI formats and HARQ-ACK information bits for SPS PDSCH receptions, two approaches can be considered. In a first approach, the UE multiplexes one HARQ-ACK information bit with NACK value for the SPS PDSCH receptions when the UE does not successfully decode any TB for the SPS PDSCH receptions; otherwise, the UE multiplexes HARQ-ACK information for all SPS PDSCH receptions (for HARQ-ACK information configured to be multiplexed in a PUCCH or PUSCH transmission in the slot). The first approach is generally sufficient as a probability that a gNB transmits more than one SPS PDSCHs to the UE and the UE fails to correctly decode corresponding TBs is typically at least an order of magnitude smaller than a BLER for HARQ-ACK information decoding. In a second approach, the UE provides HARQ-ACK information for all SPS PDSCH receptions, regardless of a decoding outcome when multiplexed together with HARQ-ACK information in response to PDSCH receptions scheduled by DCI formats). The second approach ensures that a gNB and a UE always have a same understanding of a number of HARQ-ACK information bits for configured SPS PDSCH receptions.

In certain embodiments, when a UE multiplexes a number of HARQ-ACK information bits in a PUSCH transmission, a gNB can control a corresponding resource overhead and ensure that a known number of REs is used for HARQ-ACK multiplexing by configuring a reference number of HARQ-ACK information bits $O_{ACK,ref}$ for the UE to use in determining a number of REs for multiplexing HARQ-ACK information in a PUSCH. The functionality of $O_{ACK,ref}$ is to replace an actual HARQ-ACK information payload $O_{ACK}$ in Equation (1) for the purpose of determining a number of coded modulation symbols for mapping to REs in a PUSCH transmission. The HARQ-ACK information payload that the UE multiplexes in the PUSCH is $O_{ACK}$. The consequence of $O_{ACK,ref}$ potentially being different than $O_{ACK}$ is that an actual BLER for the HARQ-ACK information would be somewhat different than a target BLER.

For example, when a UE multiplexes HARQ-ACK information for 8 SPS PDSCH receptions in a PUSCH, the UE can generate a HARQ-ACK codebook with $O_{ACK}=8$ HARQ-ACK information bits and determine a number of coded modulation symbols corresponding to $O_{ACK,ref}=2$ HARQ-ACK information bits. When using a Reed-Mueller code, a BLER depends on a number of unknown bits and therefore, when a gNB does not transmit more than 2 SPS PDSCHs to the UE with HARQ-ACK information in the HARQ-ACK codebook, the HARQ-ACK codebook BLER would not be larger than a target BLER even though the HARQ-ACK codebook includes $O_{ACK}=8$ HARQ-ACK information bits and the number of coded modulation symbols in the PUSCH is determined for $O_{ACK,ref}=2$ HARQ-ACK information bits. In this manner, an unnecessary overhead for multiplexing an HARQ-ACK codebook in response to SPS PDSCH receptions in a PUSCH is avoid without errors in having a same understanding between the gNB and the UE for a payload of the HARQ-ACK codebook at least when the gNB does not adjust a number of coded modulation symbols such as when the PUSCH transmission is configured by higher layers. CRC bits, when any for $O_{ACK,ref}$ HARQ-ACK information bits, can be added to $O_{ACK,ref}$ when determining a number of coded modulation symbols to multiplex an encoded HARQ-ACK codebook in a PUSCH. It is also possible that multiple values for $O_{ACK,ref}$ are configured or are predetermined in the specifications of the system operation and the UE selects the $O_{ACK,ref}$ that is larger than or equal to $O_{ACK}$ for determining a number of REs in a PUSCH to multiplex the $O_{ACK}$ HARQ-ACK information bits. For example, $O_{ACK,ref}$ can be in multiples of 4 bits such as $O_{ACK,ref}$=4, 8, 12, 16, . . . .

A use of $O_{ACK,ref}$ as a reference number of HARQ-ACK information bits can be further conditioned on the PUSCH transmission being configured by higher layers while, when the PUSCH transmission is scheduled by a DCI format, a DAI field in the DCI format can be used to unambiguously determine $O_{ACK}$ and then a use of $O_{ACK,ref}$ is unnecessary for avoiding a possible ambiguity in the number of HARQ-ACK information bits and in a corresponding number of REs in the PUSCH used for multiplexing the number of HARQ-ACK information bits (after encoding).

As shown in FIG. 10, a UE receives by a serving gNB a configuration for a reference number of HARQ-ACK information bits $O_{ACK,ref}$ (step 1010). In step 1020, the UE determines a number of coded modulation symbols in a PUSCH for multiplexing a HARQ-ACK codebook that includes $O_{ACK}$ bits by assuming a HARQ-ACK codebook size of $O_{ACK,ref}$ bits. In step 1030, the UE transmits the PUSCH with the multiplexed HARQ-ACK codebook.

Although FIGS. 8, 9, and 10 illustrate the methods 800, 900, and 1000 various changes may be made to FIGS. 8, 9, and 10. For example, while the method 800 of FIG. 8, the method 900 of FIG. 9, and the method 1000 of FIG. 10 are shown as a series of steps, various steps could overlap, occur in parallel, occur in a different order, or occur multiple times. In another example, steps may be omitted or replaced by other steps. For example, steps of the method 800 can be executed in a different order.

Embodiments of the present disclosure also describe adjusting CRC protection to target BLER. The following examples and embodiments, such as those of FIG. 11 describe adjustments in CRC protection to target BLER. In these embodiments, this disclosure considers procedures for determining a number of CRC bits for an encoded UCI based on configuration or a priority value for the UCI.

Figure 11:
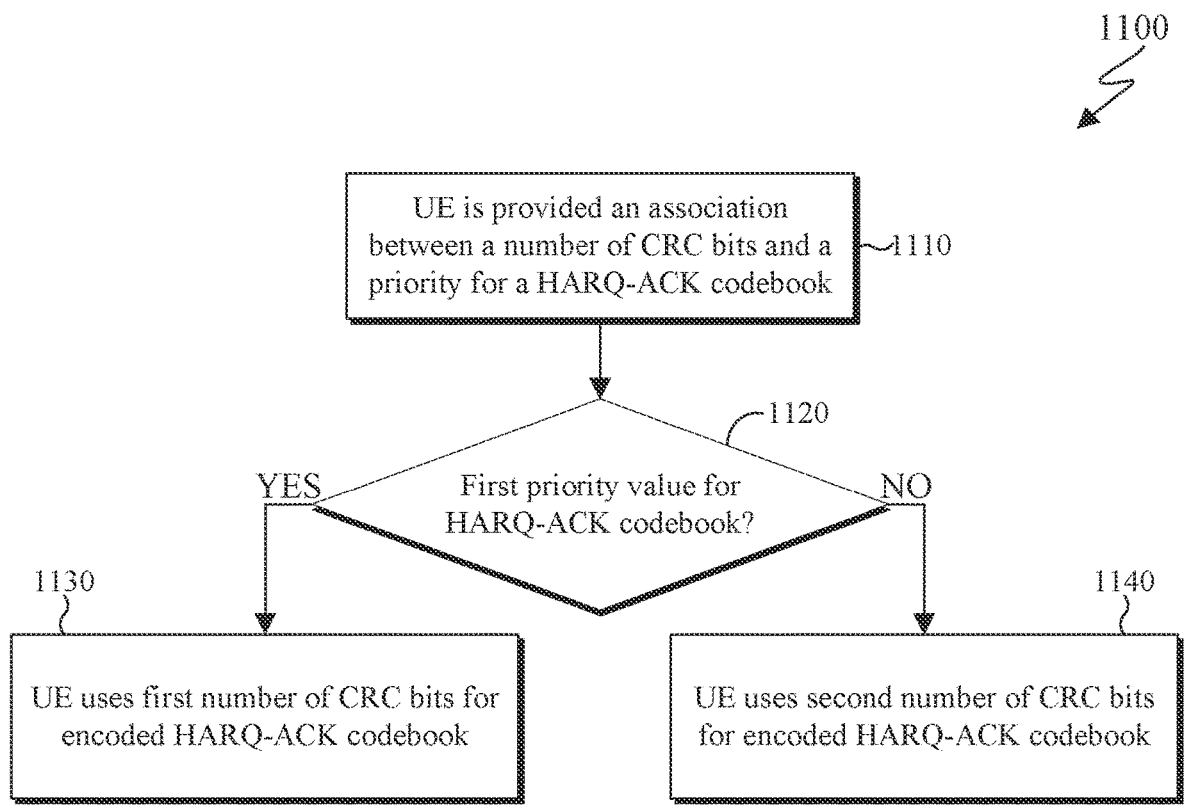
FIG. 11 illustrates an example method of a UE determining a number of CRC bits for an encoded UCI codeword according to embodiments of the present disclosure.

FIG. 11 illustrates an example method 1100 of a UE determining a number of CRC bits for an encoded UCI codeword according to embodiments of the present disclosure. The steps of the method 1100 can be performed by any of the UEs 111-116 of FIG. 1, such as the UE 116 of FIG. 3. The method 1100 is for illustration only and other embodiments can be used without departing from the scope of the present disclosure.

For a same UCI payload, a UE (such as the UE 116) can be configured to generate and include in an encoded UCI codeword a different number of CRC bits. An association between a number of CRC bits and a UCI codeword can be based on a priority value associated with the UCI codeword.

For example, when UCI is HARQ-ACK information, a priority can be determined by an explicit or implicit indication from a DCI format scheduling a corresponding PDSCH reception or as part of the higher layer configuration for a PDSCH reception when it is not scheduled by a DCI format.

For another example, when HARQ-ACK information has priority 0, a first number of CRC bits are used for encoding a corresponding HARQ-ACK codebook. Additionally, when HARQ-ACK information has priority 1, a second number of CRC bits are used for encoding a corresponding HARQ-ACK codebook. The first and second number of CRC bits can be specified in the system operation or be configured by higher layers though UE-common or UE-specific RRC signaling. The second number of CRC bits can also be zero as a BLER of HARQ-ACK codebook with high reliability can be smaller than a probability of a CRC check error corresponding to a small number of CRC bits when using a large number of CRC bits would be detrimental. An additional condition for using different number of CRC bits can be a payload of an encoded UCI codeword. For example, different number of CRC bits can be used only when a payload of an encoded UCI codeword is smaller than a predetermined or configured value. This is described in FIG. 11, below.

As shown in FIG. 11, a UE is provided an association between a number of CRC bits for an encoded UCI codeword, such as a HARQ-ACK codebook, and a priority of the UCI codeword (step 1110). The association can be specified in the system operation or provided by higher layers. For example, a first number of CRC bits, such as 6, can be specified in the system operation and a second number of CRC bits, such as 11, can be provided by higher layers (or the reverse). The UE receives a PDSCH and generates corresponding HARQ-ACK information to include in a HARQ-ACK codebook for TBs provided by the PDSCH wherein the PDSCH is scheduled by a DCI format that includes a priority indicator field indicating a priority value or is configured by higher layers and the configuration include a priority value.

In step 1120, the UE determines whether a priority value of the HARQ-ACK codebook is a first value, such as 0, or a second value, such as 1. When the priority value is the first value, the UE, in step 1130, uses the first number of CRC bits for the encoded HARQ-ACK codebook. Alternatively, the priority value is the second value, the UE, in step 1140, uses the second number of CRC bits for the encoded HARQ-ACK codebook.

Although FIG. 11 illustrates the method 1100 various changes may be made to FIG. 11. For example, while the method 1100 of FIG. 11 is shown as a series of steps, various steps could overlap, occur in parallel, occur in a different order, or occur multiple times. In another example, steps may be omitted or replaced by other steps. For example, steps of the method 1100 can be executed in a different order.

Embodiments of the present disclosure further describe reporting soft ACK values. The following examples and embodiments, such as those of FIGS. 12, 13, 14, and 15 reporting soft ACK values. In these embodiments, this disclosure considers procedures for a UE to determine a classification for a soft ACK value to be smaller than or equal to a threshold (such as a small soft ACK value) or larger than a threshold (such as a large soft ACK value).

Figure 12:
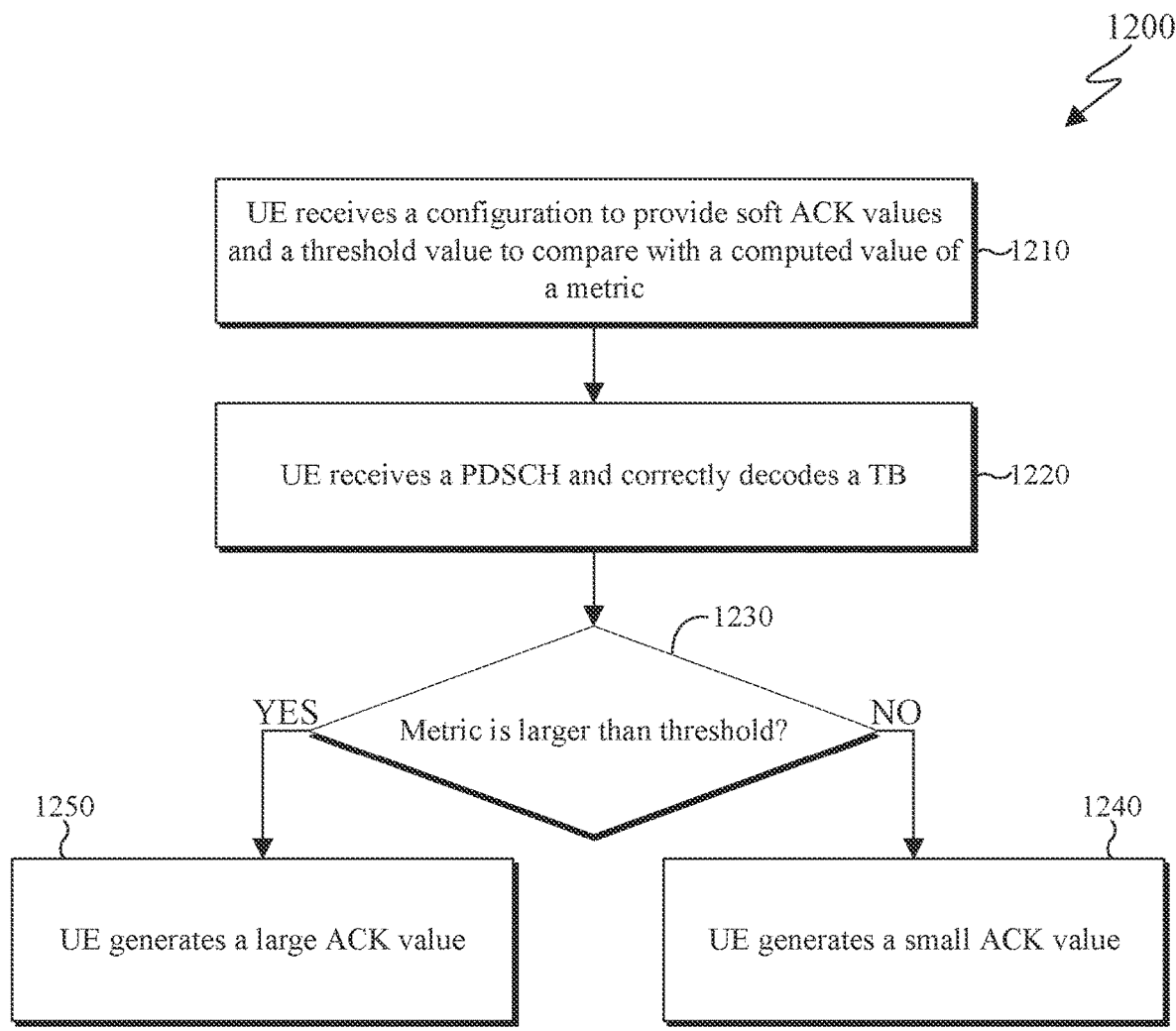
FIG. 12 illustrates an example method of a UE determining a soft ACK value according to embodiments of the present disclosure.
Figure 13:
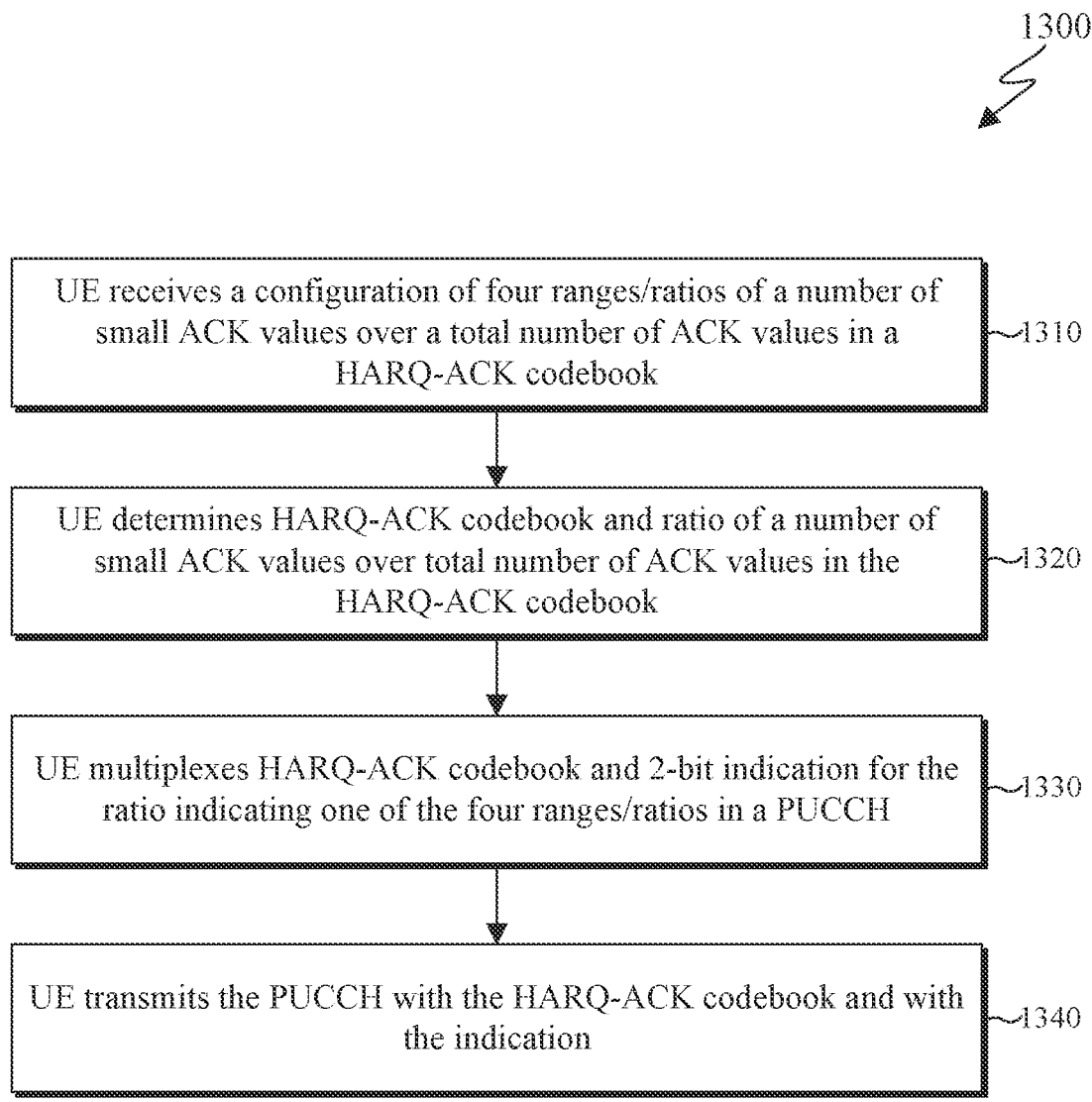
FIG. 13 illustrates an example method of a UE reporting a ratio between a number of ACK values with corresponding soft values that are smaller than a threshold over a total number of ACK values in a HARQ-ACK codebook according to embodiments of the present disclosure.
Figure 14:
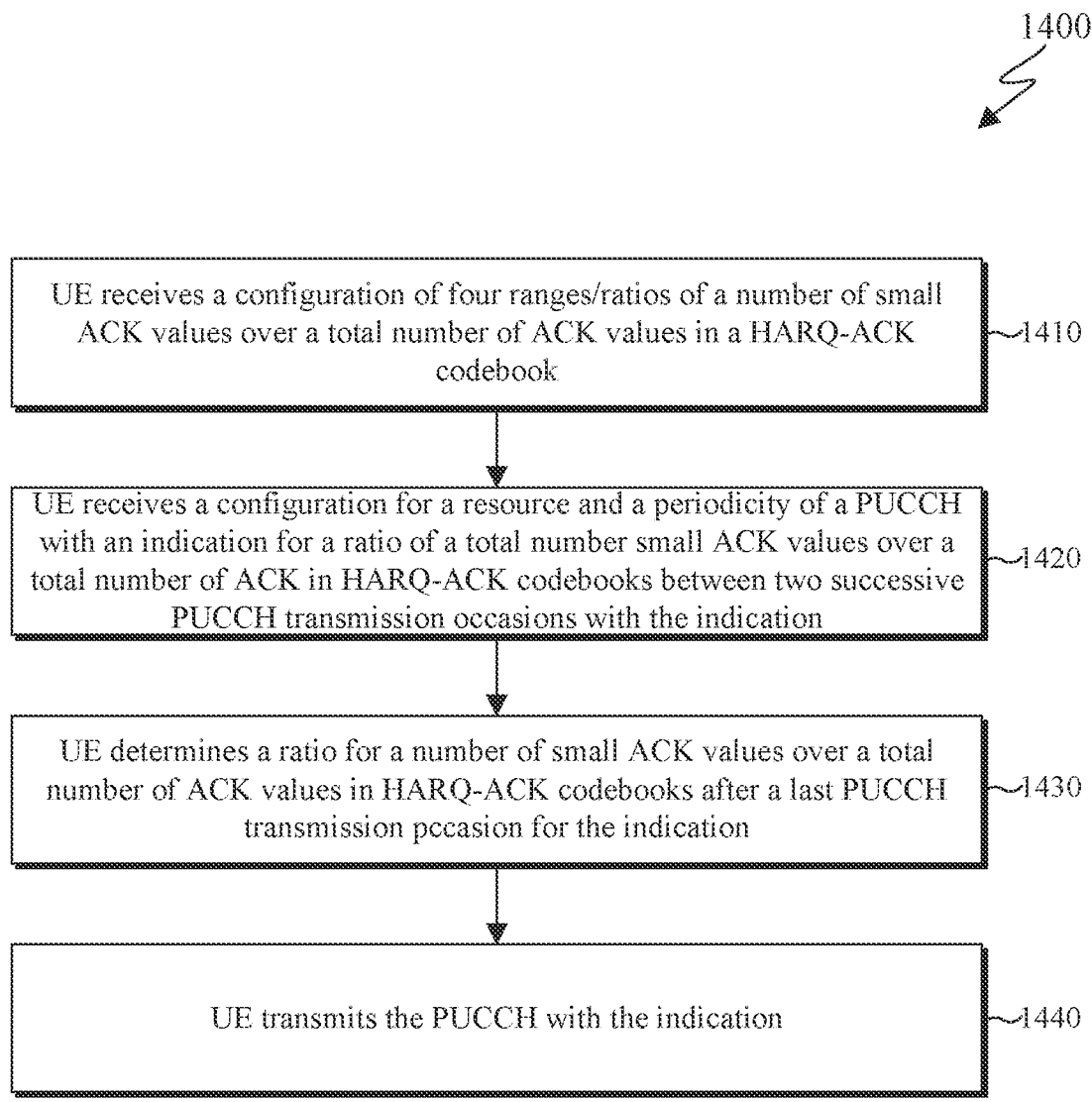
FIG. 14 illustrates an example method of a UE reporting a ratio between a number of ACK values with corresponding soft values that are smaller than a threshold over a total number of ACK values in multiple HARQ-ACK codebooks according to embodiments of the present disclosure.
Figure 15:
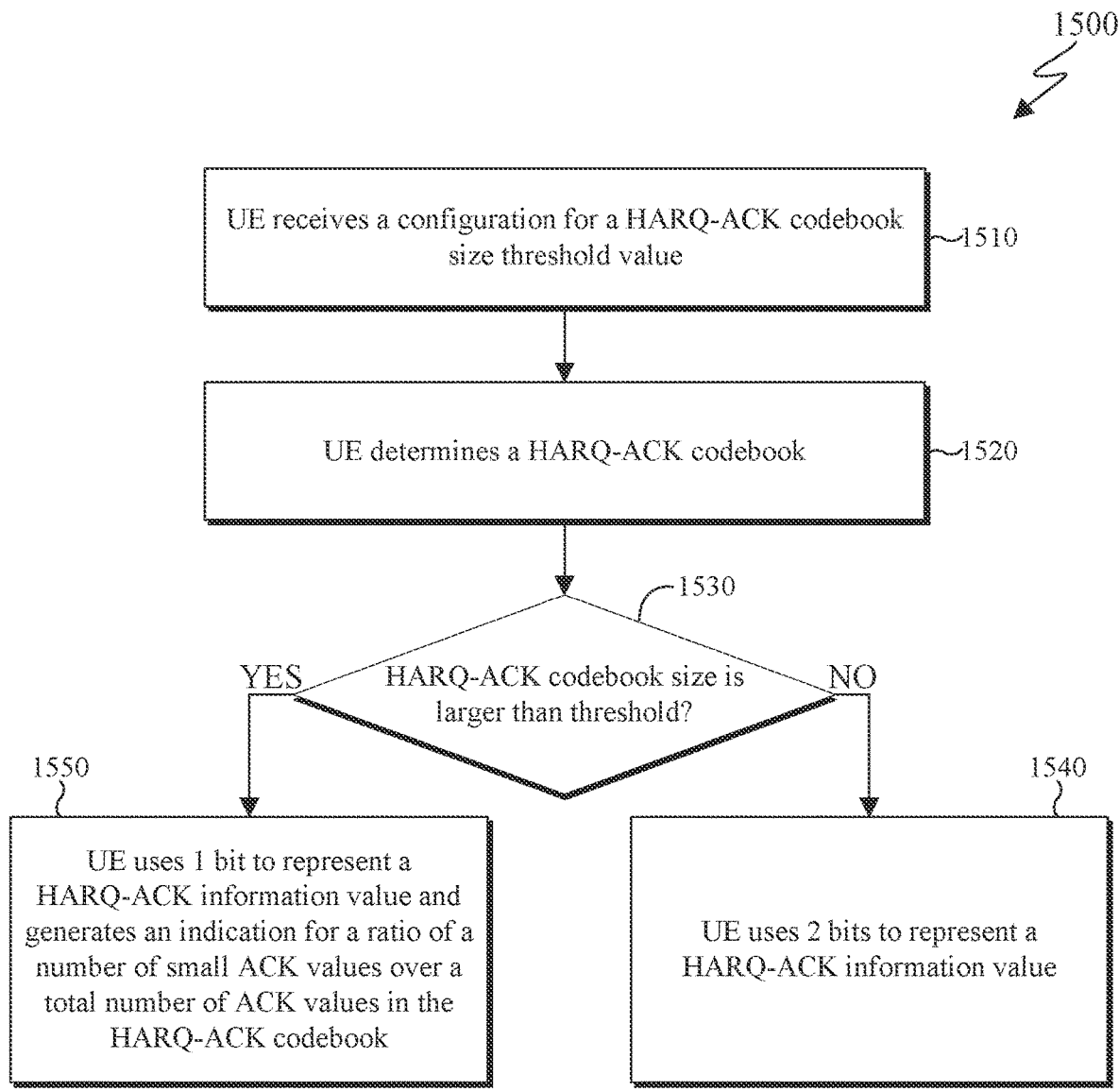
FIG. 15 illustrates an example method of a UE determining whether to report soft ACK values or report a ratio for a number of small ACK values over a total number of ACK values in a HARQ-ACK codebook according to embodiments of the present disclosure.

FIG. 12 illustrates an example method 1200 of a UE determining a soft ACK value according to embodiments of the present disclosure. FIG. 13 illustrates an example method 1300 of a UE reporting a ratio between a number of ACK values with corresponding soft values that are smaller than a threshold over a total number of ACK values in a HARQ-ACK codebook according to embodiments of the present disclosure. FIG. 14 illustrates an example method 1400 of a UE reporting a ratio between a number of ACK values with corresponding soft values that are smaller than a threshold over a total number of ACK values in multiple HARQ-ACK codebooks according to embodiments of the present disclosure. FIG. 15 illustrates an example method 1500 of a UE determining whether to report soft ACK values or report a ratio for a number of small ACK values over a total number of ACK values in a HARQ-ACK codebook according to embodiments of the present disclosure. The steps of the method 1200, the method 1300, the method 1400, and the method 1500 can be performed by any of the UEs 111-118 of FIG. 1, such as the UE 116 of FIG. 3. The method 1200, the method 1300, the method 1400, and the method 1500 are for illustration only and other embodiments can be used without departing from the scope of the present disclosure.

In certain embodiments, a UE can indicate (for example as part of a capability signaling), a metric that the UE can support for determining soft ACK values. The UE can also indicate a corresponding threshold value for the metric. Here, the UE would indicate a small ACK value when the metric is smaller than or equal to the threshold and a large ACK value otherwise. The gNB can also provide to the UE a threshold value. If the gNB does not provide to the UE the threshold value, the UE uses the threshold value that the UE indicated. For example, a metric can be a number of iterations for a LDPC decoder, an average or mean absolute value for soft likelihood metrics prior to the LDPC decoder, a received power of a DM-RS included in a PDSCH reception providing a TB for the corresponding HARQ-ACK information, and so on.

In certain embodiments, the UE can also indicate (for example as part of a capability signaling), a capability to use multiple metrics. The UE can additionally indicate multiple corresponding thresholds for the multiple metrics. The gNB can configure the UE one of the multiple metrics for the UE to use in determining soft ACK values and the gNB can also configure a threshold for the metric. Alternatively, the gNB can configure the UE more than one metrics and can also configure more than one corresponding thresholds for the UE to determine soft ACK values. In such case, for example, the UE can determine a large ACK value when the UE determines a large ACK value based on all metrics and the corresponding thresholds; otherwise, the UE determines a small ACK value.

FIG. 12 illustrates the method 1200 for a UE to determine a soft ACK value according to the disclosure.

As shown in FIG. 12, a UE receives by a serving gNB a configuration to provide soft ACK values and a threshold value to compare with a computed value of a metric (step 1210). In step 1220, the UE receives a PDSCH and correctly decodes a TB provided by the PDSCH. In step 1230, the UE determines whether a metric for the PDSCH reception or for the TB decoding operation is larger than the threshold. When the metric is not larger than the threshold, the UE, in step 1240, generates a small ACK value. Alternatively, when the metric is larger than the threshold, the UE, in step 1250, generates a large ACK value.

When a UE reports more than one ACK value for a TB decoding outcome, the corresponding HARQ-ACK information can include, for example, two bits to indicate at least 3 states that include a large ACK value, a small ACK value, and a NACK value. A medium ACK value or a differentiation of NACK values between small and large may also be introduced to utilize a fourth state that is available in case of two HARQ-ACK information bits. Therefore, a number of HARQ-ACK information bits that a UE needs to provide per TB doubles over the conventional one where the UE reports only a single HARQ-ACK information bit with an ACK or NACK value for the TB decoding outcome.

To reduce a HARQ-ACK information payload when a UE provides information for soft ACK values, the UE can provide in a HARQ-ACK codebook a percentage of the ACK values that are larger or smaller than a threshold. A gNB can then determine, at least approximately, a number of ACK values that are large or small based on a total number of ACK values in the HARQ-ACK codebook. For example, for a HARQ-ACK codebook that a gNB detects and includes 12 ACK values, the gNB can determine that a number of small ACK values is 0 or 1 when an indication for a percentage of small ACK values is less than 10%, and can determine that a number of small ACK values is 1 or 2 when an indication for a percentage of small ACK value is between 10% and 20%.

For example, a UE can include a 2-bit field together with HARQ-ACK information bits in a HARQ-ACK codebook to indicate a percentage/ratio of small ACK values over a total number of ACK values in the HARQ-ACK codebook, such as less than 10%, between 10% and 20%, between 20% and 30%, or larger than 30%. The ranges of percentages can be specified in the system operation or can be configured to the UE by the gNB through higher layer signaling. As a percentage of small ACK values is typically smaller than a percentage of large ACK values for applications of interest where OLLA benefits from a UE providing soft ACK values, the ranges can include small values for percentages/ratios of small ACK values over a total number of ACK values in a HARQ-ACK codebook. A similar mechanism can directly apply if the ranges are defined with respect to the percentages of large ACK values over the total number of ACK values and the ranges can include large percentage values. Instead of reporting per HARQ-ACK codebook the percentage/ratio of small ACK values over a total number of ACK values or in general, soft HARQ-ACK values, the reporting can be per configured number of HARQ-ACK codebooks, or per configured number of actual HARQ-ACK information bits, or per an absolute time period that can be configured by higher layers.

FIG. 13 illustrates the method 1300 for a UE (such as the UE 116) to report a ratio between a number of ACK values with corresponding soft values that are smaller than a threshold over a total number of ACK values in a HARQ-ACK codebook.

As shown in FIG. 13, a UE receives by a serving gNB a configuration of four ranges for percentages/ratios of a number of small ACK values over a total number of ACK values in a HARQ-ACK codebook (step 1310). For example, the four ranges can be less than $1/16$, between $1/16$ and $1/8$, between $1/8$ and $1/4$, and larger than $1/4$.

In step 1320, the UE determines a HARQ-ACK codebook to multiplex in a PUCCH transmission and a ratio of a number of small ACK values over a total number of ACK values in the HARQ-ACK codebook. In step 1330, the UE multiplexes the HARQ-ACK codebook and an indication for the ratio that is represented by 2 bits indicating one of the four ranges. In step 1340, the UE transmits the PUCCH with the HARQ-ACK codebook and the indication for the ratio of a number of small ACK values over a total number of ACK values in the HARQ-ACK codebook.

An indication for the percentage of small ACK values relative to a total number of ACK values in a HARQ-ACK codebook can be either jointly encoded with the HARQ-ACK information and be part of the HARQ-ACK codebook or can be separately encoded from the HARQ-ACK information. In the latter case, for multiplexing in a PUCCH, a UE (such as the UE 116) can multiplex the indication in a same PUCCH transmission as for the HARQ-ACK codebook or in a separate PUCCH transmission. PUCCH resources for a separate PUCCH transmission can be (i) configured to the UE by higher layers, (ii) indicated by a DCI format such as a DCI format scheduling a PDSCH reception with corresponding HARQ-ACK information included in the HARQ-ACK codebook, or (iii) derived relative to the PUCCH resource of the PUCCH transmission with the HARQ-ACK codebook.

If a separate PUCCH resource is configured for a PUCCH transmission with the indication information, the configuration can also include a periodicity for the PUCCH transmission and the indication can be for a percentage/ratio of small ACK values in one or more HARQ-ACK codebooks in PUCCH or PUSCH transmissions after a last PUCCH transmission with the indication. For example, a UE can be configured a periodicity of 20 milliseconds to provide an indication for a percentage/ratio of small ACK values over a total number of ACK values that a UE includes in HARQ-ACK codebooks that the UE multiplexes in corresponding PUCCH or PUSCH transmissions within the period of 20 milliseconds. For example, when a UE provides 4 HARQ-ACK codebooks in PUCCH/PUSCH transmissions within a period of 20 milliseconds, the indication for the percentage/ratio of small ACK values is for the percentage/ratio of all small ACK values over the total number of ACK values that the UE includes in the 4 HARQ-ACK codebooks. For example, the indication can be part of a periodic or semi-persistent CSI report by the UE.

FIG. 14 illustrates the method 1400 for a UE to report a ratio between a number of ACK values with corresponding soft values that are smaller than a threshold over a total number of ACK values in multiple HARQ-ACK codebooks.

As shown in FIG. 14, a UE receives by a serving gNB a configuration of four ranges for percentages/ratios of a number of small ACK values (soft HARQ-ACK values) over a total number of ACK values in a HARQ-ACK codebook (step 1400). For example, the four ranges can be less than 1/16, between 1/16 and 1/8, between 1/8 and 1/4, and larger than 1/4.

In step 1420, the UE also receives a configuration for a PUCCH resource and a periodicity for a PUCCH transmission with an indication for a ratio of a total number small ACK values over a total number of ACK values, or for soft HARQ-ACK values, in a number of HARQ-ACK codebooks that the UE multiplexes in PUCCH or PUSCH transmissions between two successive occasions of the PUCCH transmission with the indication. When the UE does not multiplex any HARQ-ACK information in a PUCCH/PUSCH transmission within two successive occasions of the PUCCH transmission with the indication, the UE may not transmit the latter PUCCH with the indication.

In step 1430, the UE determines a ratio for a total number of small ACK values over a total number of ACK values, or the soft HARQ-ACK values, in HARQ-ACK codebooks that the UE multiplexes in PUCCH or PUSCH transmissions after a last PUCCH transmission with the indication. In step 1440, the UE transmits the PUCCH with the indication.

A UE can be configured by a serving gNB, or can be predetermined in a system operation, a minimum HARQ-ACK codebook size for the UE to apply signaling of a percentage of small ACK values over a total number of ACK values. When the HARQ-ACK codebook size is larger than or equal to the configured minimum size, signaling of a percentage/ratio of small ACK values can be expected to be meaningful because a total number of ACK values can be expected to be large and avoiding a doubling in the HARQ-ACK codebook size is also most beneficial when a HARQ-ACK codebook size is large. Otherwise, when the HARQ-ACK codebook size is smaller than the minimum one, the UE can generate 2 bits for each TB decoding outcome in order to directly indicate whether a soft ACK value is a smaller than or equal to a threshold or larger than the threshold. Similar to small NACK values, a percentage of small (or large) NACK values may additionally or alternatively be provided.

FIG. 15 illustrates the methods 1500 for a UE to determine whether to report soft ACK values or report a ratio for a number of small ACK values over a total number of ACK values in a HARQ-ACK codebook.

In step 1510, a UE receives by a serving gNB a configuration for a HARQ-ACK codebook size threshold value. In step 1520, the UE determines a HARQ-ACK codebook for multiplexing in a PUCCH or PUSCH transmission. In step 1530, the UE determines whether a size of the HARQ-ACK codebook is larger than the threshold. When the HARQ-ACK codebook size is not larger than the threshold, the UE, in step 1540, uses 2 bits to represent a HARQ-ACK information value. Alternatively, when the HARQ-ACK codebook size is larger than the threshold, the UE, in step 1550, uses 1 bit to represent a HARQ-ACK information value and generates an indication for a ratio of a number of small ACK values over a total number of ACK values in the HARQ-ACK codebook.

For multi-bit HARQ-ACK information in a HARQ-ACK codebook (such as a Type-1 or a Type-2 HARQ-ACK codebook) and for a PDSCH reception that is scheduled by a DCI format, it is not possible for a gNB to distinguish between NACK (incorrect detection of TBs in the PDSCH) and DTX (incorrect detection of the DCI format). At least when a first BLER for detection of a DCI format and a second BLER for detection of TBs in a PDSCH reception that is scheduled by the DCI format are comparable, or when the first BLER is materially larger than the second BLER, it is beneficial to indicate a number or percentage of NACK values (or a number or percentage of DTX values) from the NACK/DTX values in the HARQ-ACK codebook, particularly considering that both the first and second BLERs are typically 10% or smaller and a number of NACK/DTX values in the HARQ-ACK codebook is small. In practice, for similar first and second BLERs, DTX is more likely than NACK because a signal-to-interference and noise ratio (SINR) resulting to correct (or incorrect) DCI format detection is likely to also result to correct (or incorrect) TB detection as channel conditions that a UE experiences for PDCCH and PDSCH receptions in a same slot, or in neighboring slots, are similar. A tri-state HARQ-ACK information report, explicitly providing ACK, NACK, and DTX values, solves the issue but typically doubles a payload of the HARQ-ACK codebook as, for scheduling of a PDSCH with one TB, there would be two, instead of one, HARQ-ACK information bits. As DTX/NACK values are infrequent, appending a small number of bits, such as 1-2 bits, to a HARQ-ACK codebook, such as a Type-2 HARQ-ACK codebook, in order to indicate a number or percentage of NACK values (or DTX values) among the NACK/DTX values (or among all values in case a percentage is reported) can enable OLLA in a simple manner that is deterministic and does not impose new requirements or new reporting metrics on the UE operation.

A number of additional bits to indicate a number or percentage of NACK values (or DTX values) can be specified in a system operation or can be configured to a UE by higher layer signaling. A mapping of the binary values to a number or percentage of NACK values can also be specified in a system operation or can be configured to a UE by higher layer signaling. For example, for 2 bits, values of '00', '01', '10', and '11' can respectively map to percentage ranges for NACK values (or DTX values), relative to a total number of NACK/DTX values in the HARQ-ACK codebook, of less than 25%, between 25% and 50%, between 50% and 75%, and above 75%. Alternatively, values of '00', '01', '10', and '11' can respectively map to NACK numbers of less than two, between two and four, between five and seven, and above seven.

Although FIGS. 12, 13, 14, and 15 illustrate the methods 1200, 1300, 1400, and 1500 various changes may be made to FIGS. 12, 13, 14, and 15. For example, while the method 1200 of FIG. 12, the method 1300 of FIG. 13, the method 1400 of FIG. 14, and the method 1500 of FIG. 15 are shown as a series of steps, various steps could overlap, occur in parallel, occur in a different order, or occur multiple times. In another example, steps may be omitted or replaced by other steps. For example, steps of the method 1200 can be executed in a different order.

Embodiments of the present disclosure describe generating MCS offset values. The following examples and embodiments, such as those of FIGS. 16, 17, and 18 describe a generation of MCS offset values. In these embodiments, this disclosure considers a procedure for a UE to generate MCS offsets to MCS values of received TBs. It is noted that an MCS offset can be per received TB or, in order to reduce a corresponding reporting payload, per groups of TBs. The MCS offset for a received TB is such that when added to the MCS of the received TB, a resulting MCS is such that the UE could decode the TB with BLER that is the largest BLER that is smaller than or equal to a predetermine BLER.

Figure 16:
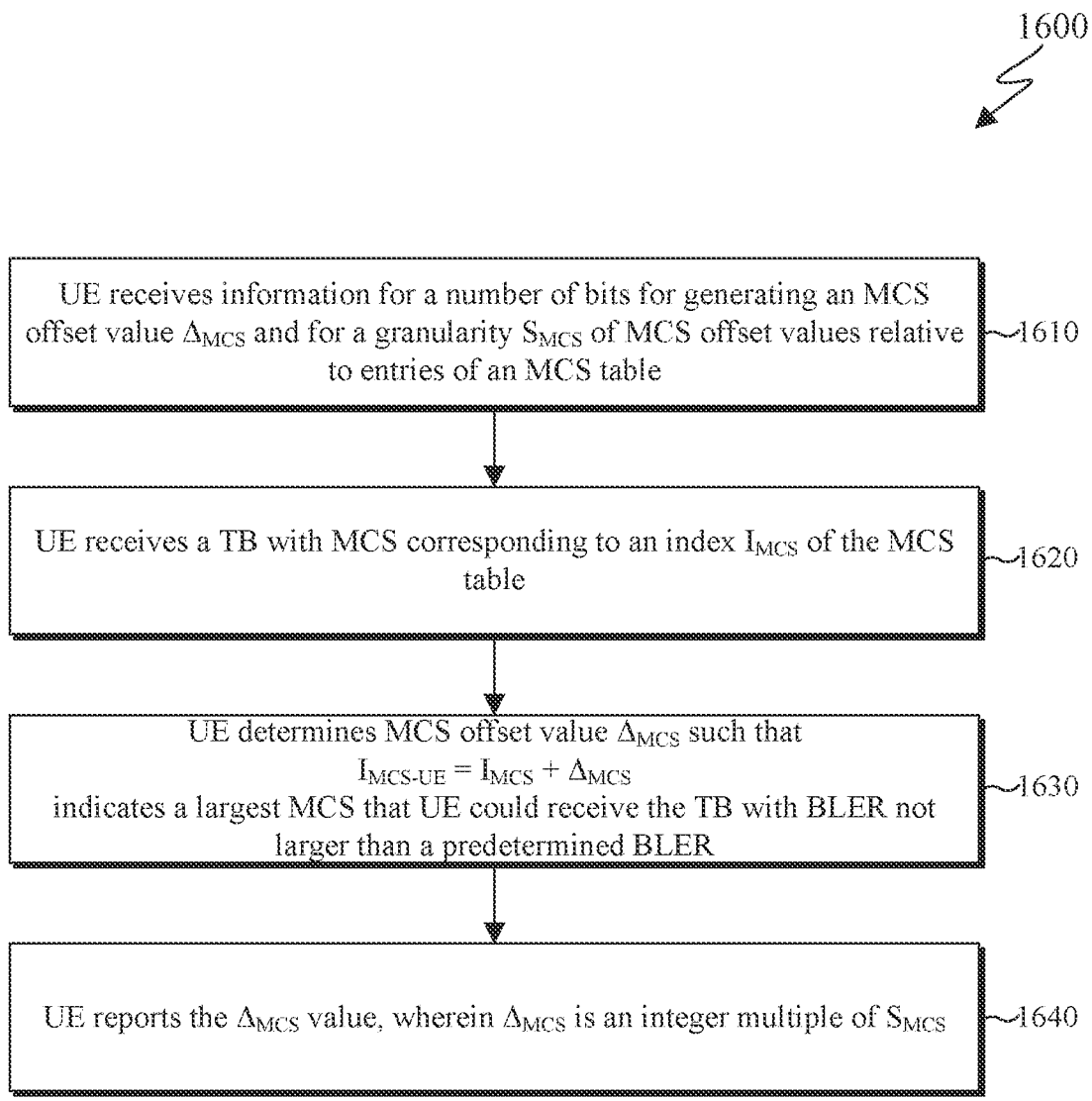
FIG. 16 illustrates an example method of a UE generating MSC values of transport block (TB) receptions according to embodiments of the present disclosure.
Figure 17:
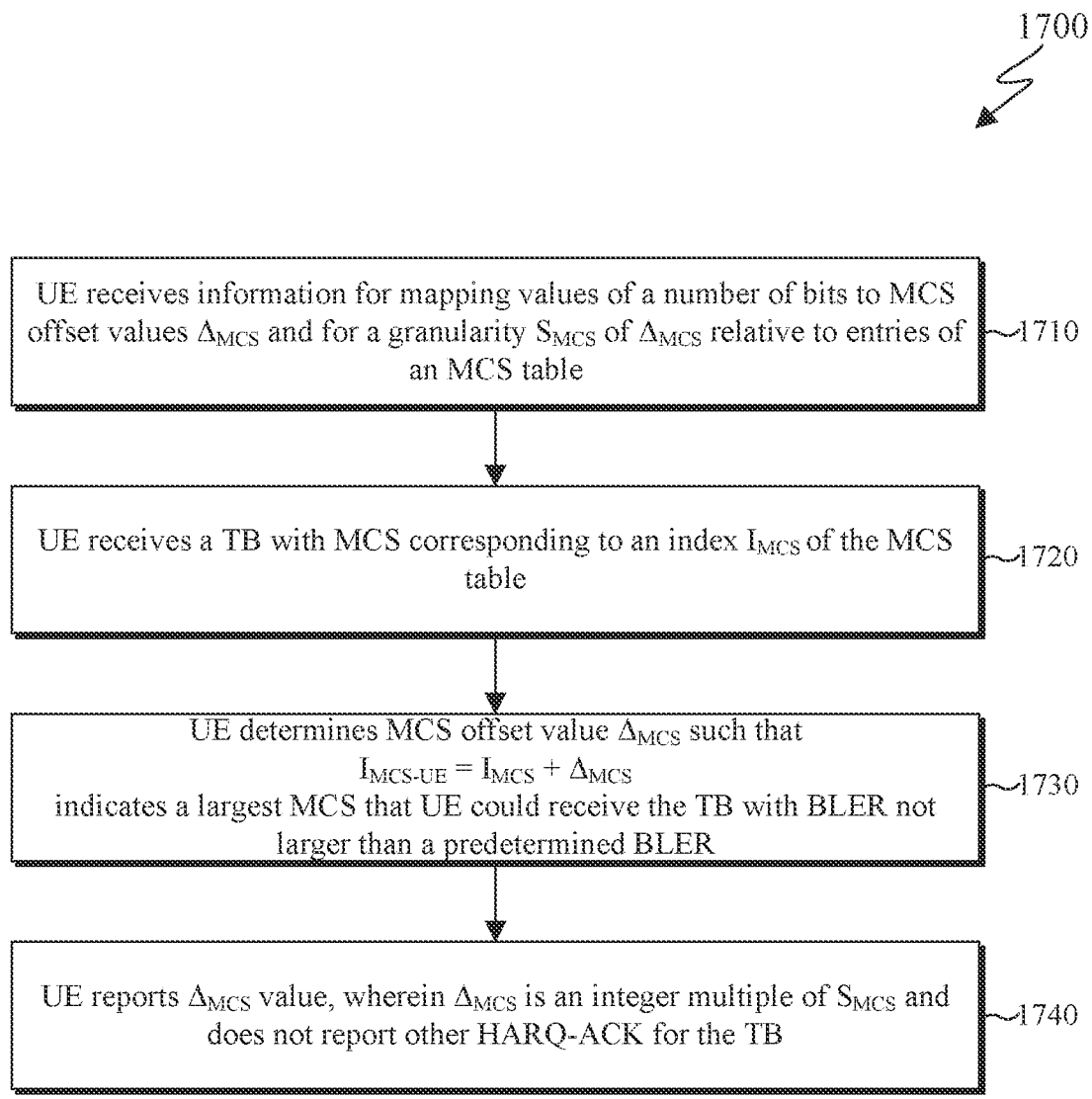
FIG. 17 illustrates an example method of a UE providing soft HARK-ACK information bits according to embodiments of the present disclosure.
Figure 18:
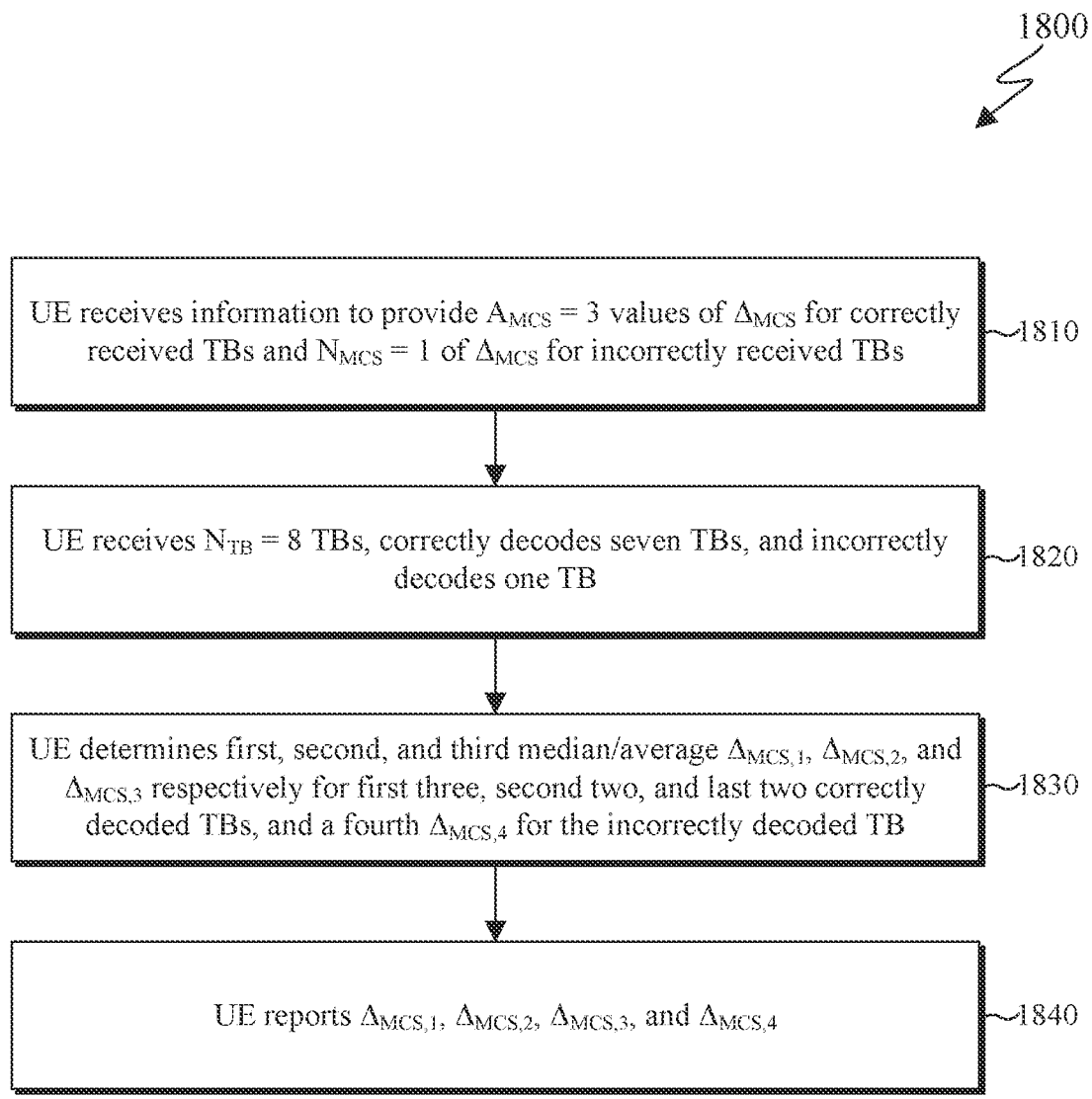
FIG. 18 illustrates an example method of a UE providing $A_{MCS}$ values of a modulating and coding scheme (MCS) offset $\Delta_{MCS}$ corresponding to a correct reception of TBs and $N_{MCS}$ values of an MCS offset $\Delta_{MCS}$ corresponding to an incorrect reception of TBs according to embodiments of the present disclosure.

FIG. 16 illustrates an example method 1600 of a UE generating MCS values of TB receptions according to embodiments of the present disclosure. FIG. 17 illustrates an example method 1700 of a UE providing soft HARK-ACK information bits according to embodiments of the present disclosure. FIG. 18 illustrates an example method 1800 of a UE providing $\Delta_{MCS}$ values of an MCS offset $\Delta_{MCS}$ corresponding to a correct reception of TBs and $N_{MCS}$ values of an MCS offset $\Delta_{MCS}$ corresponding to an incorrect reception of TBs according to embodiments of the present disclosure. The steps of the method 1600, the method 1700, and the method 1800 can be performed by any of the UEs 111-116 of FIG. 1, such as the UE 116 of FIG. 3. The method 1600, the method 1700, and the method 1800 are for illustration only and other embodiments can be used without departing from the scope of the present disclosure.

In certain embodiments, a UE can indicate (such as part of a UE capability signaling) that the UE can determine an MCS offset to an NICS value of a received TB so that a resulting MCS is such that the UE can decode the TB with BLER that is the largest BLER that is smaller than or equal to a predetermine BLER. The UE can also indicate a time the UE requires to make the determination for the MCS offset. For example, the determination of the MCS offset can be based on UE implementation aspects and include parameters such as a SINR associated with a PDSCH reception providing the TB, or on values of log-likelihood metrics for the TB decoding, or on a number of iterations for a LDPC decoder prior to a correct decoding of a TB, or on a number of failed parity checks, and so on. For a TB reception with MCS value corresponding to MCS index $I_{MCS}$, the UE can determine an MCS offset value $\Delta_{MCS}$, (also referred to as differential MCS or delta-MCS). The MCS value is described in Equation (2). The MCS value can be the largest value for which the UE would receive the TB with a BLER that is smaller than or equal to a target BLER, such as a BLER associated with a corresponding MCS table.

$$I_{MCS-UE}=I_{MCS}+\Delta_{MCS} \quad (2)$$

A range of values for $\Delta_{MCS}$, or equivalently a number of bits to represent $\Delta_{MCS}$ in a report to a serving gNB, can range from a minimum of 1 bit to a maximum of number of bits used to represent the MCS index $I_{MCS-UE}$, such as 5 bits. In case of the maximum number of bits, it is also possible to directly indicate a value for $I_{MCS-UE}$ instead of indicating $\Delta_{MCS}$. A proper selection for the number of bits to represent $\Delta_{MCS}$ depends on a granularity for a shift $S_{MCS}$ of indexes of the MCS table that correspond to successive values of $\Delta_{MCS}$ and on a link adaptation accuracy range that the serving gNB scheduler intends to cover. For example, if different values of $\Delta_{MCS}$ correspond to successive indexes $I_{MCS}$ of the MCS table ($S_{MCS}=1$) and the gNB scheduler intends to cover a range of 6 dB in link adaptation error (e.g. +6 dB, or for −2 dB to 4 dB, and so on relative to the MCS corresponding to $I_{MCS}$), then 3 bits are needed for the $\Delta_{MCS}$ as successive MCS entries in Table 1 differ by about 0.94 dB. Similar, if different values of $\Delta_{MCS}$ correspond to every other index of the MCS table ($S_{MCS}=2$) and the gNB scheduler intends to cover a range of 6 dB in link adaptation error, then 2 bits are needed to represent a $\Delta_{MCS}$ value. Having $S_{MCS}>1$ is meaningful as it is typically difficult to have accurate adjustments to an MCS of a TB in small dB steps such as in steps of 1 dB or even 2 dB. To avoid a hard-coded design and improve usefulness for reporting $\Delta_{MCS}$ values under any possible scenario, it is beneficial that the number of bits used to represent the $\Delta_{MCS}$ value, and the granularity $S_{MCS}$ of $\Delta_{MCS}$ values (rows in the corresponding MCS table), are configurable to a UE by higher layers from the serving gNB.

In certain embodiments, values of $\Delta_{MCS}$ can be determined with reference to a decoding outcome for a TB. In other embodiments, values of $\Delta_{MCS}$ can be determined independently of a decoding outcome of a TB. In the former case, in order to reduce reporting overhead, $\Delta_{MCS} \geq 0$ if the UE reports ACK for the TB and $\Delta_{MCS} \leq 0$ if the UE reports NACK/DTX. However, the UE can also report $\Delta_{MCS}<0$ if the UE reports ACK (for example, when the BLER of the TB was determined to be larger than the target BLER). If the UE does not receive the TB due to PDCCH DTX, the UE can report $\Delta_{MCS}=0$. When a $\Delta_{MCS}$ value corresponds to a TB reception, the $\Delta_{MCS}$ value can be part of the HARQ-ACK codebook. For example, $\Delta_{MCS}$ values corresponding to TBs with HARQ-ACK information in a HARQ-ACK codebook can be appended in the HARQ-ACK codebook to avoid modification in an existing HARQ-ACK codebook construction. When the UE does not have sufficient time to include a $\Delta_{MCS}$ value for a TB, due to the time required to determine the $\Delta_{MCS}$ value for the TB being larger than a time the UE requires to multiplex the information in a PUCCH or PUSCH transmission, the UE can skip providing the $\Delta_{MCS}$ value for the TB or can report a value of 0.

For example, when a $\Delta_{MCS}$ value is represented by 2 bits, $S_{MCS}=1$, the UE receives a TB with MCS corresponding to $I_{MCS}=20$ from the MCS table in Table 1, and the UE reports a NACK for the TB, a $\Delta_{MCS}$ value of binary '00', '01', '10' or '11' for the TB can correspond to a numeric value of 0, $-S_{MCS}$, $-2 \cdot S_{MCS}$, $-3 \cdot S_{MCS}$, respectively, and by reporting $\Delta_{MCS}$ the UE effectively reports $I_{MCS-UE}$ of 20, 21, 22, or 23, respectively. When the UE reports an ACK for the TB, a $\Delta_{MCS}$ value of binary '00', '01', '10' or '11' can correspond to a numeric value of 0, 1, 2, or 3, respectively, and by reporting $\Delta_{MCS}$ the UE effectively reports $I_{MCS-UE}$ of 20, 21, 22, or 23, respectively. For example, when a $\Delta_{MCS}$ value is represented by 1 bit, $S_{MCS}=2$, the UE receives a TB with MCS corresponding to $I_{MCS}=12$ from the MCS table in Table 1, and the UE reports a NACK for the TB, a $\Delta_{MCS}$ value of binary '0' or '1' can correspond to a numeric value of 0 or $-S_{MCS}$, respectively, and by reporting $\Delta_{MCS}$ the UE effectively reports $I_{MCS-UE}$ of 12 or 10, respectively. When the UE reports an ACK for the TB, a $\Delta_{MCS}$ value of binary '0' or '1' can correspond to a numeric value of 0 or $S_{MCS}$, respectively, and by reporting $\Delta_{MCS}$ the UE effectively reports $I_{MCS-UE}$ of 12 or 14, respectively.

FIG. 16 illustrates the method 1600 for a UE (such as the UE 116) to generate MCS offsets to MCS values of TB receptions.

As shown in FIG. 16, the UE receives by a serving gNB information for a number of bits for generating an MCS offset value $\Delta_{MCS}$ and for a granularity $S_{MCS}$ of MCS offset values relative to entries of an MCS table (step 1610). In step 1620, the UE receives a TB with MCS corresponding to an index $I_{MCS}$ of the MCS table. In step 1630, the UE determines an MCS offset value $\Delta_{MCS}$ such that Equation (2), above, indicates a largest MCS value in the MCS table that the JE could receive the TB with a BLER that is not larger than a predetermined BLER, such as a BLER that is associated with the MCS table or a BLER provided to the UE by higher layers from the serving gNB. In step 1640, the UE reports the $\Delta_{MCS}$ value to the serving gNB, wherein the $\Delta_{MCS}$ is an integer multiple of $S_{MCS}$.

In certain embodiments, when a UE determines values of $\Delta_{MCS}$ independently of a decoding outcome of a TB, the UE may provide 'soft' HARQ-ACK information for the TB (instead of a binary 1 for ACK and a binary 0 for NACK). For example, for use of 2 bits to represent $\Delta_{MCS}$, a granularity for a shift of $S_{MCS}$ indexes of the MCS table, and considering that an ACK is more likely than a NACK, a '00', '01', '10' and '11' values for the TB can correspond to $-S_{MCS}$, 0, $S_{MCS}$, and $2 \cdot S_{MCS}$. Negative values can correspond to NACK and positive values can correspond to ACK.

FIG. 17 illustrates the method 1700 for a UE (such as the UE 116) to provide soft HARQ-ACK information bits according to the disclosure.

As shown in FIG. 17, the UE receives by a serving gNB information for a number of bits, for mapping each value of the number of bits to an MCS offset value $\Delta_{MCS}$, and for a granularity $S_{MCS}$ of MCS offset values $\Delta_{MCS}$ relative to entries of an MCS table, wherein the mapping includes both negative and positive $\Delta_{MCS}$ values (step 1710). In step 1720, the UE receives a TB with MCS corresponding to an index $I_{MCS}$ of the MCS table. In step 1730, the JE determines an MCS offset value $\Delta_{MCS}$ such that Equation (2), above, indicates a largest MCS value in the MCS table that the UE could receive the TB with a BLER that is not larger than a predetermined BLER, such as a BLER that is associated with the MCS table. In step 1740, the UE reports the $\Delta_{MCS}$ value to the serving gNB, wherein the $\Delta_{MCS}$ is an integer multiple of $S_{MCS}$ and the UE does not report other HARQ-ACK information for the TB.

In certain embodiments, a HARQ-ACK codebook, such as a Type-1 HARQ-ACK codebook, can include HARQ-ACK information that does not correspond to any TB reception or even to any missed DCI format detection. Therefore, to avoid a substantial overhead that would result by including a $\Delta_{MCS}$ value for each HARQ-ACK information bit, the following approaches are considered.

In a first approach, the UE (such as the UE 116) determines and provides/appends to the HARQ-ACK codebook an average or median value for $\Delta_{MCS}$ based on TBs that the UE receives and have corresponding HARQ-ACK information in the HARQ-ACK codebook.

In a second approach, the UE (such as the UE 116) determines and provides/appends to the HARQ-ACK codebook a first average or median value for $A_{MCS}$ corresponding to correct decoding of receives TBs and a second average or median value for $A_{MCS}$ corresponding to incorrect decoding of TBs with corresponding HARQ-ACK information in the HARQ-ACK codebook.

In a third approach, the second approach can be generalized and the UE (such as the UE 116) can determine and provide/append to the HARQ-ACK codebook, $\Delta_{MCS}$ average or median values for $\Delta_{MCS}$ corresponding to correct decoding of blocks of received TBs and a second $N_{MCS}$ average or median values for $\Delta_{MCS}$ corresponding to incorrect decoding of blocks of received TBs, wherein the values of $\Delta_{MCS}$ and $N_{MCS}$ can be provided to the UE by higher layers for the serving gNB and the TBs have corresponding HARQ-ACK information in the HARQ-ACK codebook. When applicable, the median or the average $\Delta_{MCS}$ can be determined after applying a floor or a ceiling function to a nearest reported $\Delta_{MCS}$ value. For example, when applicable for determining an average value of a $\Delta_{MCS,1}$ and a $\Delta_{MCS,2}$, a UE can report a largest $\Delta_{MCS}$ that is smaller than or equal to $[(\Delta_{MCS,1}+\Delta_{MCS,2})/2]$. The counting of the TBs can be per slot first in ascending order of a cell index and then across slots, or can be first across slots per cell index and then across cell indexes in ascending order of a cell index.

For example, for the third approach, denote by $N_{TB}$ a total number of TBs that the UE correctly decodes and sets M based on Equation (3), sets $M_1$ based on Equation (4), sets $N_1$ based on Equation (5), and sets $N_2$ based on Equation (6).

$$M = \min(N_{TB}, A_{MCS}) \quad (3)$$

$$M_1 = \mod(N_{TB}, M), \quad (4)$$

$$N_1 = \lceil N_{TB}/M \rceil \quad (5)$$

$$N_2 = \lfloor N_{TB}/M \rfloor \quad (6)$$

Then, for each block of TBs m, m=0, 1, ... $M_1-1$, the UE determines a median/average $\Delta_{MCS}$ for TBs with indexes $m \cdot N_1+n$, n=0, 1, ... $N_1-1$ and for each block of TBs m, $m=M_1, M_1+1, \ldots M-1$, the UE determines a median/average $\Delta_{MCS}$ for TBs with indexes $M_1 \cdot N_1+(m-M_1) \cdot N_1+n$, n=0, 1, ... $N_2-1$. When $N_{TB}<\Delta_{MCS}$, the last $\Delta_{MCS}-N_{TB}$ values are $\Delta_{MCS}=0$. The UE provides $\Delta_{MCS}$ values for the determined median/average $\Delta_{MCS}$ for each of the $\Delta_{MCS}$ aforementioned blocks of TBs with ACK values. The UE repeats the above process to provide $N_{MCS}$ values for the determined median/average $\Delta_{MCS}$ for each block of TBs with NACK values.

It is also possible that instead of blocks of received TBs, a UE provides average/median $\Delta_{MCS}$ values, or a standard deviation of $\Delta_{MCS}$ values, per number of slots per cell, or per number of slots and per number of cells in case of operation with carrier aggregation. The number can be provided to the UE by higher layers from a serving gNB. The average/median $\Delta_{MCS}$ values, or a standard deviation of $\Delta_{MCS}$ values, can be separately provided for correctly received TBs and for incorrectly received TBs or can be jointly provided for all TBs regardless of a correct or incorrect reception outcome.

It is also possible that a UE is provided a maximum HARQ-ACK codebook size $O_{ACK-MCS}^{max}$ for when the UE includes MCS offset values in addition to HARQ-ACK information. Then, the UE reports MCS offset values $\Delta_{MCS}$ for a first or last received TBs (or first or last HARQ-ACK information bits) that correspond to up to $O_{ACK-MCS}^{max} - O_{ACK}$ bits, wherein $O_{ACK}$ is a number of HARQ-ACK information bits. When the number of bits for MCS offset values $\Delta_{MCS}$ corresponds to less than $O_{ACK-MCS}^{max} - O_{ACK}$ bits, the UE can set the remaining bits to a predetermined value, such as zero. It is also possible that the UE is provided a maximum number of $N_{MCS,max}$ MCS offset values to include in a HARQ-ACK codebook wherein, when a number of HARQ-ACK information bits is larger than the maximum number of MCS offset values, the UE provides MCS offset values for the first $N_{MCS,max}$ HARQ-ACK information bits or last $N_{MCS,max}$ HARQ-ACK information bits.

FIG. 18 illustrates the method 1800 for a UE (such as the UE 116) to provide $\Delta_{MCS}$ values of an MCS offset $\Delta_{MCS}$ corresponding to correct reception of TBs and $N_{MCS}$ values of an MCS offset $\Delta_{MCS}$ corresponding to incorrect reception of TBs according to the disclosure.

As shown in FIG. 18, the UE receives by a serving gNB information to provide $\Delta_{MCS}=3$ values of MCS offset $\Delta_{MCS}$ for correctly received TBs and $N_{MCS}=1$ values of an MCS offset $\Delta_{MCS}$ for incorrectly received TBs (step 1810). In step 1820, the UE receives $N_{TB}=8$ TBs, correctly decodes seven TBs, and incorrectly decodes one TB. In step 1830, the UE determines a first median/average $\Delta_{MCS,1}$ for the first three correctly decoded TBs, a second median/average $\Delta_{MCS,2}$ for the next two correctly decoded TBs, and a third median/average $\Delta_{MCS,3}$ for the last two correctly decoded TBs, and determines a $\Delta_{MCS,4}$ for the incorrectly decoded TB. In step 1840, the UE reports the $\Delta_{MCS,1}$, $\Delta_{MCS,2}$, $\Delta_{MCS,3}$ and $\Delta_{MCS,4}$ values.

For a Type-2 HARQ-ACK codebook, in addition to providing a number of $\Delta_{MCS}$ or a number of $N_{MCS}$ median/average $\Delta_{MCS}$ values, as previously described, it is possible for a UE (such as the UE 116) to provide a $\Delta_{MCS}$ value for each HARQ-ACK information bit. Whether the UE provides $\Delta_{MCS}$ or $N_{MCS}$ median/average values for $\Delta_{MCS}$ or provides a $\Delta_{MCS}$ value for each HARQ-ACK information bit can be configured to the UE by a serving gNB by higher layer signaling. It is also possible that for a NACK/DTX value that is a DTX value (known to the UE but not known to the gNB), the UE can provide a $\Delta_{MCS}=0$ value. For HARQ-ACK information that is not associated with a TB reception, such as for example for a HARQ-ACK information bit corresponding to a SPS PDSCH release, the UE can include a $\Delta_{MCS}=0$ value in order to maintain a predetermined total size of the combined information by having a one-to-one association between a HARQ-ACK information bit and a $\Delta_{MCS}$ value. Alternatively, by considering a CCE aggregation level to be an MCS for a DCI format (modulation is QPSK and the MCS then depends only on the coding rate that is determined by the DCI format size and the CCE aggregation level), the UE can provide a $\Delta_{MCS}$ value corresponding to a smaller, same, or larger CCE aggregation level. The resulting HARQ-ACK codebook may still be referred to as "Type-2 with MCS offset" or may be referred to differently, such as Type-4.

Regardless of a HARQ-ACK codebook type, a gNB (such as the BS 102) can configure a UE (such as the UE 116) a number of received TBs or a number of slots/cells for the UE to provide $\Delta_{MCS}$ values. The number can be one or larger, and the counting of the TBs can be either across the time domain/slots first followed by the cell domain/cells or across the cell domain/cells first followed by the time domain/slots.

A number of methods can be considered for the UE to provide $\Delta_{MCS}$ values, when a UE is configured to receive two TBs in a PDSCH by spatial multiplexing and is configured to apply bundling for the HARQ-ACK information for the two TBs, wherein the UE generates a NACK value when the UE incorrectly decodes at least one of the two TBs.

In a first method, the UE determines a $\Delta_{MCS}$ value separately per TB. When the UE decodes a TB correctly, a corresponding $\Delta_{MCS}$ value is included in $\Delta_{MCS}$ values for TBs with ACK value; otherwise, the $\Delta_{MCS}$ value is included in the $\Delta_{MCS}$ values for TBs with NACK value.

In a second method, the UE generates an average $\Delta_{MCS}$ value for the two TBs based on the individual $\Delta_{MCS}$ values. For example, if the UE correctly decodes the first TB and it is $\Delta_{MCS}=2\cdot S_{MCS}$ and incorrectly decodes the second TB and it is $\Delta_{MCS}=-S_{MCS}$, the UE reports $\Delta_{MCS}=0$ when the floor function applies to the average $\Delta_{MCS}$ value that is in units of $S_{MCS}$ entries of the MCS table.

In a third method, the UE reports the smaller $\Delta_{MCS}$ value for the two TBs and, for the previous example, the UE reports $\Delta_{MCS}=-S_{MCS}$.

In a fourth method, for a Type-2 HARQ-ACK codebook, the UE generates a $\Delta_{MCS}$ value for each of the two TBs even though the UE generates one HARQ-ACK information bit for the decoding outcomes of the two TBs.

Although FIGS. 16, 17, and 18 illustrate the methods 1600, 1700, and 1800 various changes may be made to FIGS. 16, 17, and 18. For example, while the method 1600 of FIG. 16, the method 1700 of FIG. 17, and the method 1800 of FIG. 18 are shown as a series of steps, various steps could overlap, occur in parallel, occur in a different order, or occur multiple times. In another example, steps may be omitted or replaced by other steps. For example, steps of the method 1600 can be executed in a different order.

Embodiments of the present disclosure also describe reporting MCS offset values. The following examples and embodiments, such as those of FIGS. 19 and 20 describe reporting of MCS offset values. In these embodiments, this disclosure considers a procedure for a UE to report MCS offset values of received TBs to a serving gNB.

Figure 19:
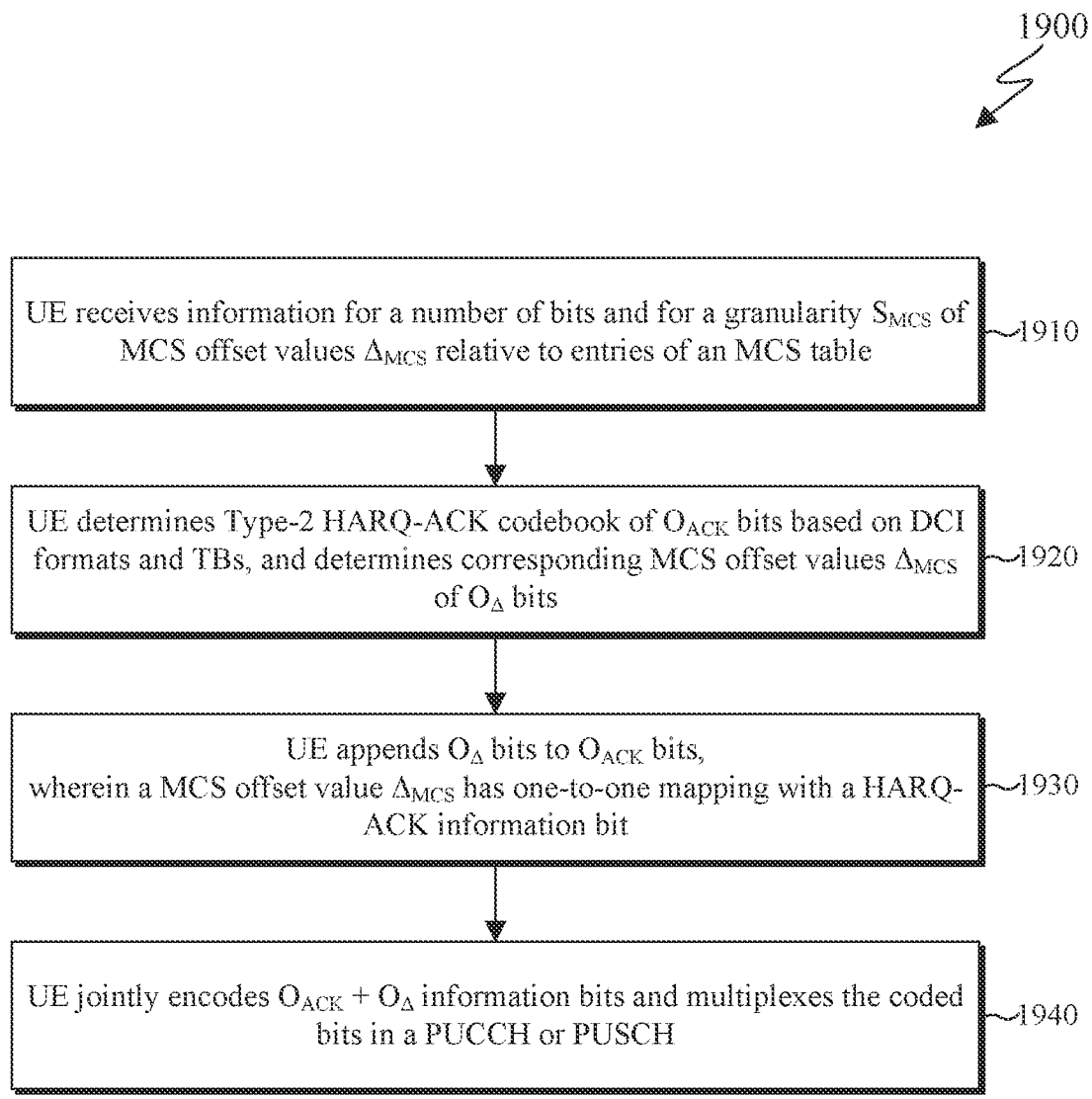
FIG. 19 illustrates an example method of a UE providing MCS offset values $\Delta_{MCS}$ and corresponding HARQ-ACK information for a Type-2 HARQ-ACK codebook with MCS offset according to embodiments of the present disclosure.
Figure 20:
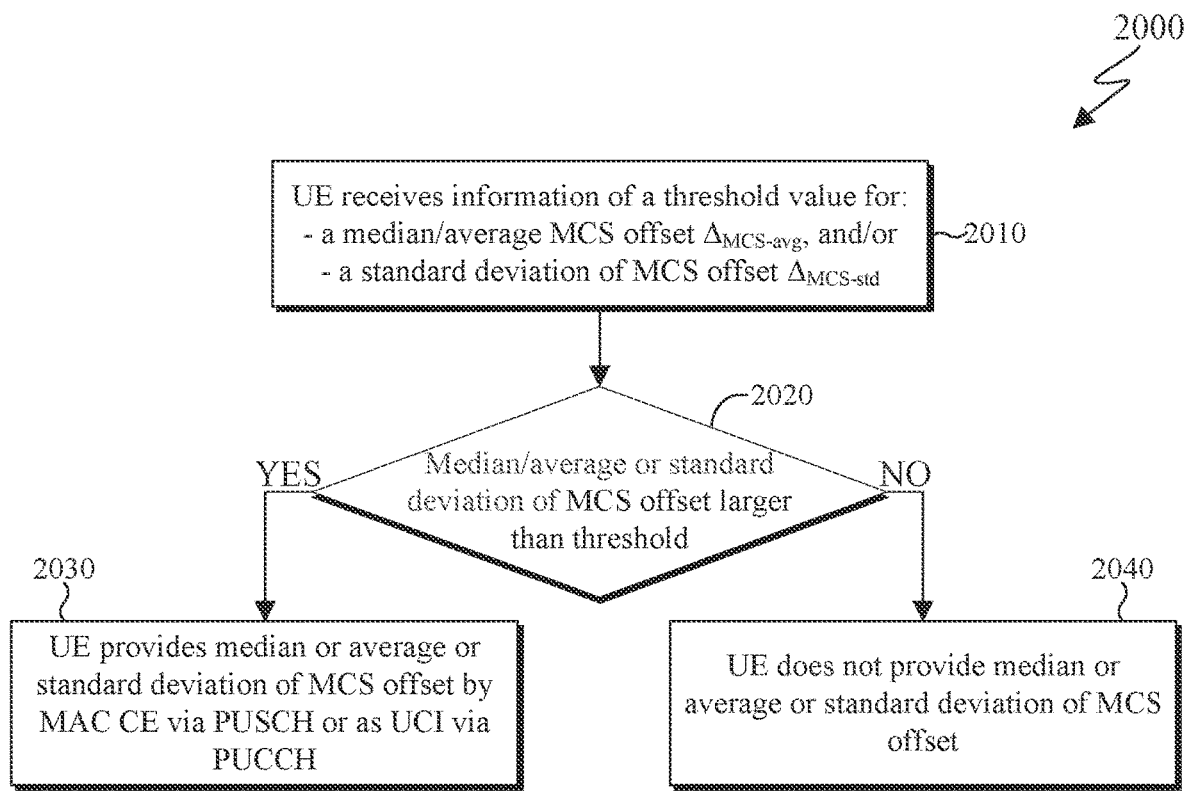
FIG. 20 illustrates an example method of a UE providing MCS offset values $\Delta_{MCS}$ or statistics of $\Delta_{MCS}$ values, based on conditions according to embodiments of the present disclosure.

FIG. 19 illustrates an example method 1900 of a UE providing MCS offset values $\Delta_{MCS}$ and corresponding HARQ-ACK information for a Type-2 HARQ-ACK codebook with MCS offset according to embodiments of the present disclosure. FIG. 20 illustrates an example method 2000 of a UE providing MCS offset values $\Delta_{MCS}$ or statistics of $\Delta_{MCS}$ values, based on conditions according to embodiments of the present disclosure. The steps of the method 1900 and the method 2000 can be performed by any of the UEs 111-116 of FIG. 1, such as the UE 116 of FIG. 3. The method 1900 and the method 2000 are for illustration only and other embodiments can be used without departing from the scope of the present disclosure.

In certain embodiments, when a UE reports $\Delta_{MCS}$ values together with HARQ-ACK information values, the UE can jointly code the HARQ-ACK information and the $\Delta_{MCS}$ values. The UE can append the $\Delta_{MCS}$ values to the HARQ-ACK codebook prior to joint encoding. Denoting by $O_{ACK}$ a number of HARQ-ACK information bits and by $O_\Delta$ a number of bits for the $\Delta_{MCS}$ values, a UE can multiplex HARQ-ACK information bits and $\Delta_{MCS}$ values in a PUCCH transmission or in a PUSCH transmission as when the UE multiplexes only HARQ-ACK information bits, wherein $O_{ACK}$ is replaced by $O_{ACK}+O_\Delta$. Therefore, a UE determines a PUCCH resource or a power for a PUCCH transmission based on a payload of $O_{ACK}+O_\Delta$ bits (and also including CRC bits and other UCI bits when applicable). For example, for a Type-2 HARQ-ACK codebook when a $\Delta_{MCS}$ value is represented by 1 bit for an associated HARQ-ACK bit, $O_\Delta=O_{ACK}$. For multiplexing HARQ-ACK information bits and MCS offset bits in a PUSCH transmission, in case of joint coding of the $O_{ACK}$ bits and the $O_\Delta$ bits, the UE can determine a number of resource elements as for HARQ-ACK information bits by considering an HARQ-ACK information payload of $O_{ACK}+O_\Delta$ bits, instead of $O_{ACK}$ bits. In case of separate coding of the $O_{ACK}$ bits and the $O_\Delta$ bits, the UE can separately determine a number of resource elements for the MCS offset bits.

FIG. 19 illustrates the method 1900 for a UE (such as the UE 116) to provide MCS offset values $\Delta_{MCS}$ and corresponding HARQ-ACK information for a Type-2 HARQ-ACK codebook with MCS offset.

As shown in FIG. 19, the UE receives by a serving gNB information for a number of bits to represent an MCS offset value $\Delta_{MCS}$ and for a granularity $S_{MCS}$ of MCS offset values $\Delta_{MCS}$ relative to entries of an MCS table (step 1910). In step 1920, the UE determines a Type-2 HARQ-ACK codebook based on receptions of DCI formats and TBs and corresponding MCS offset values $\Delta_{MCS}$. For example, the UE determines a Type-2 HARQ-ACK codebook of $O_{ACK}$ bits based on DCI formats and TBs. The UE also determines corresponding MCS offset values $\Delta_{MCS}$ of $O_\Delta$ bits.

In step 1930, the UE appends $O_\Delta$ bits. Here, the MCS offset value $\Delta_{MCS}$ has a one-to-one mapping with a HARQ-ACK information bit. That is, the UE appends $O_\Delta$ bits for the MCS offset values $\Delta_{MCS}$ to the $O_{ACK}$ bits for the Type-2 HARQ-ACK codebook. A MCS offset value $\Delta_{MCS}$ can have the one-to-one mapping with a HARQ-ACK information bit at least when bundling does not apply to HARQ-ACK information for TBs of a same PDSCH or also when bundling applies as previously described. An MCS offset value $\Delta_{MCS}$ is mapped to a multiple k≥0 of $S_{MCS}$ when a corresponding HARQ-ACK information bit is ACK and is mapped to a multiple k≤0 of $S_{MCS}$ when a corresponding HARQ-ACK information bit is NACK.

In step 1940, the UE jointly encodes the HARQ-ACK information bits and the MCS offset bits. The UE in step 1940 also multiplexes the coded information in a PUCCH or PUSCH transmission.

When a UE (such as the UE 116) is configured to provide $\Delta_{MCS}$ values for respective TB receptions, the UE can be indicated by DCI formats associated with HARQ-ACK information in a same HARQ-ACK codebook whether the UE should provide only the HARQ-ACK information or both the HARQ-ACK information and the corresponding $\Delta_{MCS}$ values. The UE can expect all DCI formats associated with a same HARQ-ACK codebook to provide a same indication. The indication can be provided by a field in a DCI format. For example, a binary field can indicate whether the UE should provide $\Delta_{MCS}$ values for TB receptions together with corresponding HARQ-ACK information or whether the UE should provide only the HARQ-ACK information. For example, a first subset of a set of PUCCH resources can be configured for providing $\Delta_{MCS}$ values for TB receptions together with corresponding HARQ-ACK information while a second subset can be configured for providing only HARQ-ACK information and a PUCCH resource indicator (PRI) field in a DCI format can indicate a PUCCH resource from the first set or from the second set. The indication can additionally or alternatively depend on a HARQ-ACK information payload. For example, a UE can be configured a reference HARQ-ACK information payload $O_{ACK-ref}$ and the UE provides $\Delta_{MCS}$ values associated only with up to $O_{ACK-ref}$ HARQ-ACK information bits where, for example, the $O_{ACK-ref}$ HARQ-ACK information bits can be the first $O_{ACK-ref}$ or the last $O_{ACK-ref}$ HARQ-ACK information bits of a HARQ-ACK codebook.

In certain embodiments, a UE can additionally or alternatively be configured to provide $\Delta_{MCS}$ values separately from HARQ-ACK information. For example, a report for $\Delta_{MCS}$ values, or for statistics of $\Delta_{MCS}$ values, can be indicated by a reportquantity value in a corresponding CSI-ReportConfig information element that provides configuration parameters for CSI reporting. The contents of a CSI report for $\Delta_{MCS}$ values associated with TB receptions can be statistics for the $\Delta_{MCS}$ values, such as an average or median and a standard deviation. The statistics can also be separately provided for TBs that the UE decodes correctly (ACK) and for TBs that the UE decodes incorrectly (NACK). The statistics for $\Delta_{MCS}$ values can be the ones corresponding to TB receptions between two successive reports with $\Delta_{MCS}$ values. For determining and reporting the statistics, each of the $\Delta_{MCS}$ values can include the whole range of a corresponding MCS table and does not need to be confined within a range of an MCS for a corresponding TB.

A UE can additionally or alternatively be configured to provide $\Delta_{MCS}$ values, or statistics of $\Delta_{MCS}$ values, based on predetermined conditions that can be specified in the system operation or configured to the UE by higher layers. For example, when the median of $\Delta_{MCS}$ values or the standard deviation for $\Delta_{MCS}$ values exceed a corresponding value that is provided in advance by higher layers, the UE can provide the median or standard deviation for $\Delta_{MCS}$ values through a medium access control (MAC) control element (CE) in a PUSCH transmission. The statistics for the $\Delta_{MCS}$ values can correspond to a number of TB receptions or to TB receptions within a time period prior to the generation of the statistics wherein the number of TB receptions or the time period can be provided to the UE from a serving gNB by higher layer signaling.

FIG. 20 illustrates the method 2000 for a UE (such as the UE 116) to provide MCS offset values $\Delta_{MCS}$, or statistics of $\Delta_{MCS}$ values, based on conditions according to the disclosure.

As shown in FIG. 20, the UE receives by a serving gNB information of a threshold value for a median or average MCS offset $\Delta_{MCS-avg}$ and/or for a standard deviation of a MCS offset $\Delta_{MCS-std}$ (step 2010). In step 2020, the UE determines whether a median or average MCS offset or the standard deviation of a MCS offset is larger than (or equal to) the corresponding threshold. When the median or average MCS offset or the standard deviation of the MCS offset is larger than (or equal to) the corresponding threshold, the UE, in step 2030, provides the median or average MCS offset or the standard deviation of the MCS offset through a MAC CE in a PUSCH transmission or as UCI in a PUCCH transmission using preconfigured resources. Alternatively, when the median or average MCS offset or the standard deviation of the MCS offset is less than the corresponding threshold, the UE, in step 2040, does not provide the median or average MCS offset or the standard deviation of the MCS offset.

Although FIGS. 19 and 20 illustrate the methods 1900 and 2000 various changes may be made to FIGS. 19 and 20. For example, while the method 1900 of FIG. 9 and the method 2000 of FIG. 20 are shown as a series of steps, various steps could overlap, occur in parallel, occur in a different order, or occur multiple times. In another example, steps may be omitted or replaced by other steps. For example, steps of the method 1900 can be executed in a different order.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for a user equipment (UE) to provide a number of information bits, the method comprising:
    determining a number of hybrid automatic repeat request acknowledgement (HARQ-ACK) information bits based on a HARQ-ACK codebook, wherein:
        the number of HARQ-ACK information bits is larger than a first predetermined number and smaller than a second predetermined number, and
        the first and second predetermined numbers are consecutive in a set of predetermined numbers;
    determining the number of information bits by appending a number of bits, that are not HARQ-ACK information bits, to the number of HARQ-ACK information bits, wherein the number of bits is equal to a difference between the second predetermined number and the number of HARQ-ACK information bits; and
    transmitting a first physical uplink control channel (PUCCH), or a first physical uplink shared channel (PUSCH), with the number of information bits.

2. The method of claim 1, wherein the first PUCCH transmission or the first PUSCH transmission is configured by higher layer signaling.

3. The method of claim 1, wherein the HARQ-ACK codebook is a Type-2 HARQ-ACK codebook.

4. The method of claim 1, wherein all bits from the number of bits have zero value.

5. The method of claim 1, further comprising:
    determining a number of second HARQ-ACK information bits based on the HARQ-ACK codebook;
    receiving a downlink control information (DCI) format scheduling a second PUCCH transmission or a second PUSCH transmission; and
    transmitting the second PUCCH or the second PUSCH with the number of second HARQ-ACK information bits.

6. The method of claim 1, further comprising:
    determining a priority value for the number of information bits; and
    determining a number of cyclic redundancy check (CRC) bits for the number of information bits, wherein:
        the number of CRC bits is a first number when the priority value is zero, and
        the number of CRC bits is a second number when the priority value is one.

7. The method of claim 1, wherein transmitting the first PUCCH comprises transmitting the first PUCCH with the number of information bits only when at least one of the number of HARQ-ACK information bits has a value corresponding to a positive acknowledgement.

8. A user equipment (UE) comprising:
    a processor configured to determine:
        a number of hybrid automatic repeat request acknowledgement (HARQ-ACK) information bits based on a HARQ-ACK codebook, wherein:
            the number of HARQ-ACK information bits is larger than a first predetermined number and smaller than a second predetermined number, and
            the first and second predetermined numbers are consecutive in a set of predetermined numbers, and
        a number of information bits by appending a number of bits, that are not HARQ-ACK information bits, to the number of HARQ-ACK information bits, wherein the number of bits is equal to a difference between the second predetermined number and the number of HARQ-ACK information bits; and
    a transceiver operably coupled to the processor, the transceiver configured to transmit a first physical uplink control channel (PUCCH), or a first physical uplink shared channel (PUSCH), with the number of information bits.

9. The UE of claim 8, wherein the first PUCCH transmission or the first PUSCH transmission is configured by higher layer signaling.

10. The UE of claim 8, wherein the HARQ-ACK codebook is a Type-2 HARQ-ACK codebook.

11. The UE of claim 8, wherein all bits from the number of bits have zero value.

12. The UE of claim 8, wherein:
    the processor is further configured to determine a number of second HARQ-ACK information bits based on the HARQ-ACK codebook; and
    the transceiver is further configured to:
        receive a downlink control information (DCI) format scheduling a second PUCCH transmission or a second PUSCH transmission; and
        transmit the second PUCCH or the second PUSCH with the number of second HARQ-ACK information bits.

13. The UE of claim 8, wherein the processor is further configured to determine:
    a priority value for the number of information bits, and
    a number of cyclic redundancy check (CRC) bits for the number of information bits, wherein:
        the number of CRC bits is a first number when the priority value is zero, and
        the number of CRC bits is a second number when the priority value is one.

14. The UE of claim 8, wherein the transceiver is further configured to transmit the first PUCCH with the number of information bits only when at least one of the number of HARQ-ACK information bits has a value corresponding to a positive acknowledgement.

15. A base station comprising:
    a transceiver configured to receive a first physical uplink control channel (PUCCH), or a first physical uplink shared channel (PUSCH), with a number of information bits; and
    a processor operably coupled to the transceiver, the processor configured to determine:
        a number of hybrid automatic repeat request acknowledgement (HARQ-ACK) information bits based on a HARQ-ACK codebook, wherein:

the number of HARQ-ACK information bits is larger than a first predetermined number and smaller than a second predetermined number, and the first and second predetermined numbers are consecutive in a set of predetermined numbers, and the number of HARQ-ACK information bits by removing a number of last bits, that are not HARQ-ACK information bits, from the number information bits, wherein the number of last bits is equal to a difference between the second predetermined number and the number of HARQ-ACK information bits.

16. The base station of claim 15, wherein the first PUCCH reception or the first PUSCH reception are configured by higher layer signaling.

17. The base station of claim 15, wherein the HARQ-ACK codebook is a Type-2 HARQ-ACK codebook.

18. The base station of claim 15, wherein all bits from the number of last bits have zero value.

19. The base station of claim 15, wherein:

the processor is further configured to determine a number of second HARQ-ACK information bits based on the HARQ-ACK codebook; and the transceiver is further configured to:

transmit a downlink control information (DCI) format scheduling a second PUCCH reception or a second PUSCH reception; and receive the second PUCCH or the second PUSCH with the number of second HARQ-ACK information bits.

20. The base station of claim 15, wherein the processor is further configured to determine:

a priority value for the number of information bits, and a number of cyclic redundancy check (CRC) bits for the number of information bits, wherein:

the number of CRC bits is a first number when the priority value is zero, and the number of CRC bits is a second number when the priority value is one.

\* \* \* \* \*